(12) United States Patent
Kurita

(10) Patent No.: US 8,823,282 B2
(45) Date of Patent: Sep. 2, 2014

(54) LIGHT SOURCE APPARATUS

(75) Inventor: Masanao Kurita, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 13/613,845

(22) Filed: Sep. 13, 2012

(65) Prior Publication Data

US 2013/0069560 A1 Mar. 21, 2013

(30) Foreign Application Priority Data

Sep. 21, 2011 (JP) .................................. 2011-206142
Aug. 8, 2012 (JP) .................................. 2012-175940

(51) Int. Cl.
*H05B 37/00* (2006.01)
*G09F 13/08* (2006.01)
*H05B 37/02* (2006.01)

(52) U.S. Cl.
CPC ...................................... *H05B 37/02* (2013.01)
USPC .......... 315/294; 315/192; 362/97.1; 362/97.3

(58) Field of Classification Search
USPC ...................... 315/294, 318, 192; 257/72, 88; 362/97.1, 97.2, 97.3
See application file for complete search history.

(56) References Cited

U.S. PATENT DOCUMENTS 8,292,447 B2 * 10/2012 Lee et al. ..................... 362/97.1
2007/0058358 A1 * 3/2007 Chikazawa et al. ............ 362/97
2011/0043096 A1 * 2/2011 Asaki ............................ 313/483

FOREIGN PATENT DOCUMENTS

JP 2009-087772 4/2009

\* cited by examiner

*Primary Examiner* — Daniel D Chang
(74) *Attorney, Agent, or Firm* — Cowen, Liebowitz & Latman, P.C.

(57) ABSTRACT

A light source apparatus according to the present invention includes: a plurality of light emitting substrates arranged in matrix form, each having at least one light source; an intermediate substrate provided between respective rows of the plurality of light emitting substrates; and a driving unit that outputs a drive signal for driving the light sources, wherein a first supply wiring for supplying the drive signal to the light source provided on each of the plurality of light emitting substrates is printed on each of the light emitting substrates, and a first connection wiring for electrically connecting the first supply wirings printed on two light emitting substrates sandwiching the intermediate substrate is printed on the intermediate substrate.

9 Claims, 20 Drawing Sheets

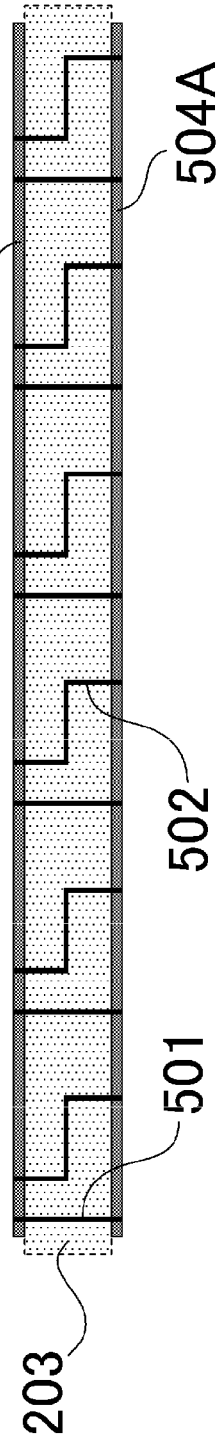
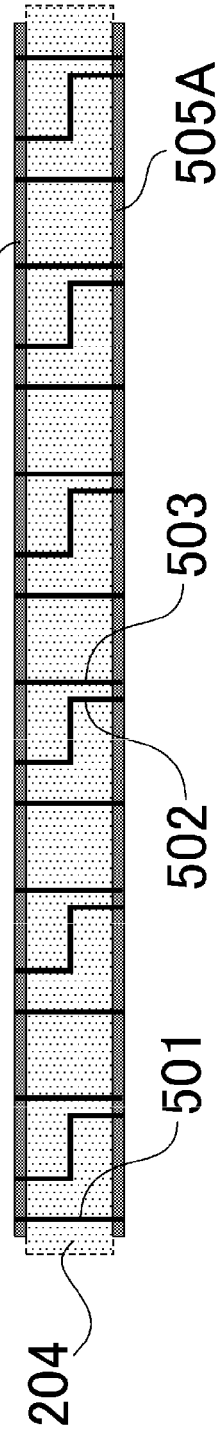
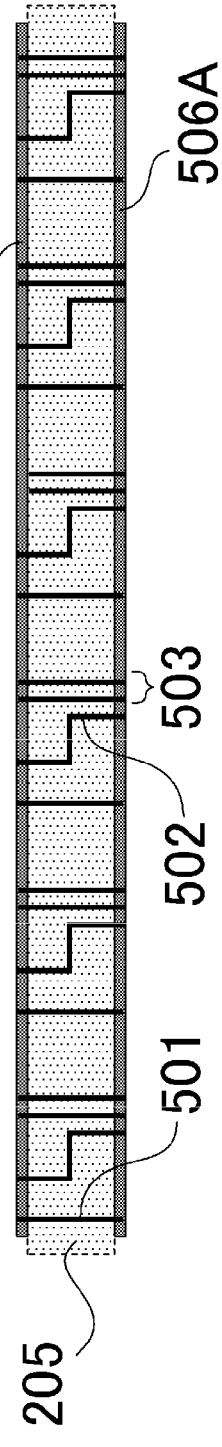
FIG. 7A
FIG. 7B
FIG. 7C

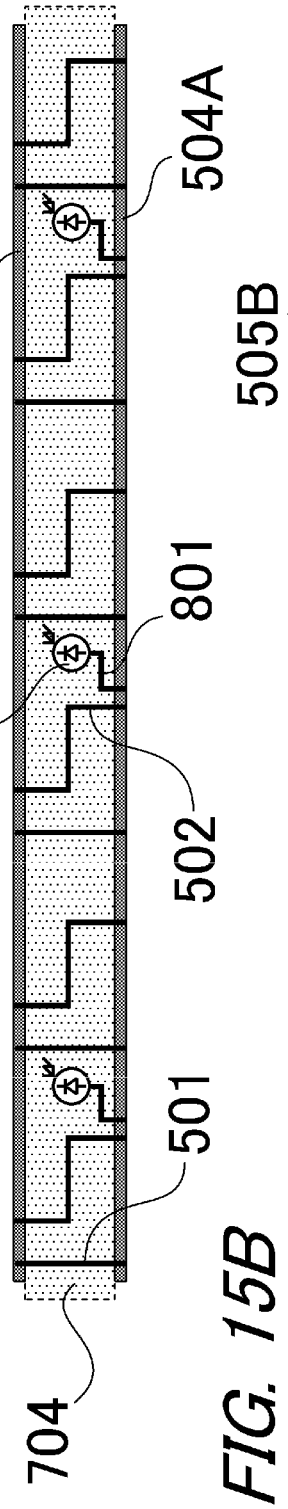
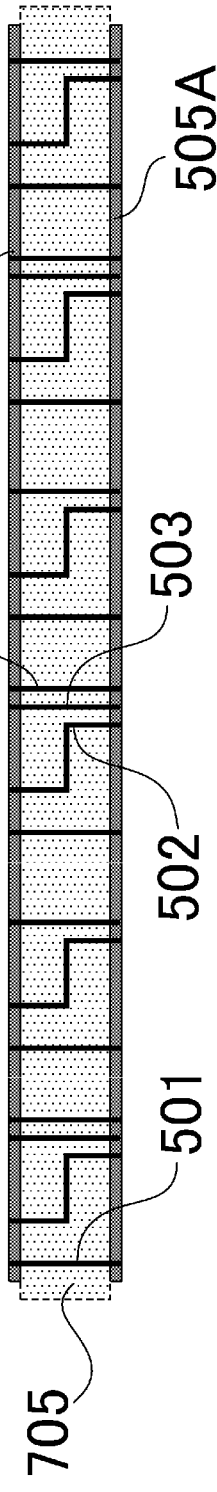
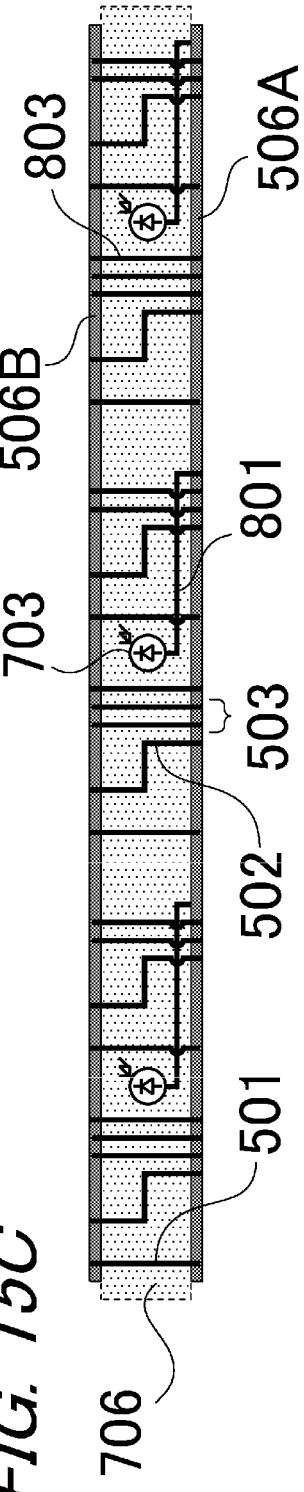
FIG. 15A
FIG. 15B
FIG. 15C

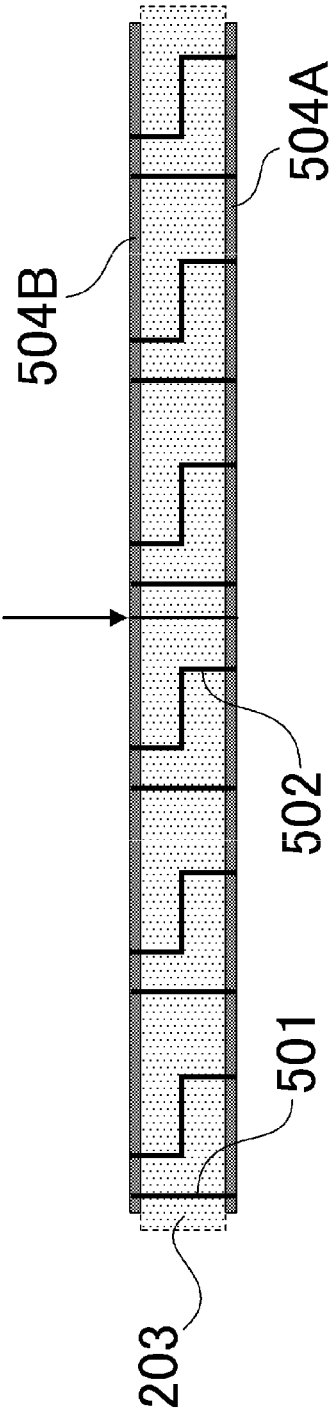
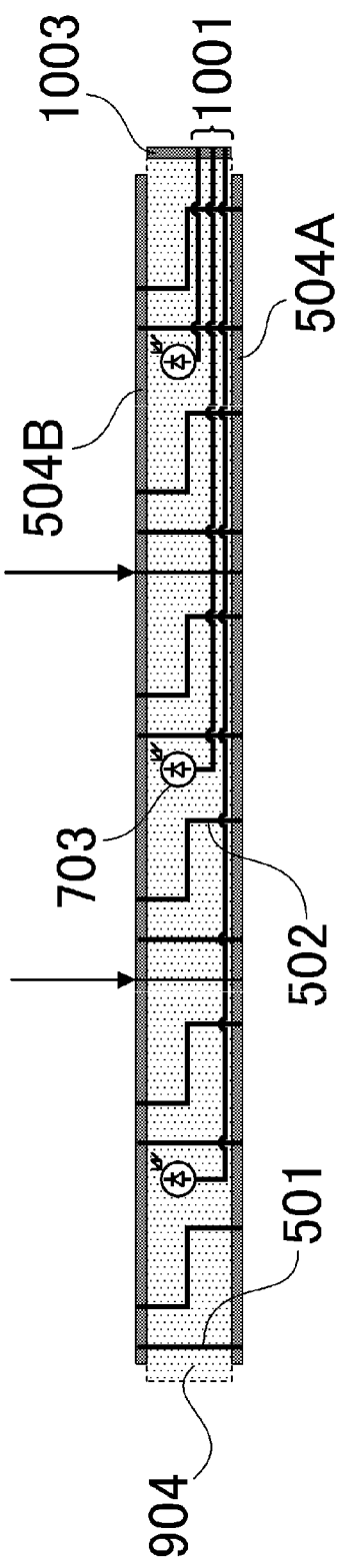

LIGHT SOURCE APPARATUS

BACKGROUND OF THE INVENTION

1. Field of the Invention

The present invention relates to a light source apparatus.

2. Description of the Related Art

A color image display apparatus typically includes a color liquid crystal panel having color filters and a backlight apparatus that emits white light onto a back surface of the color liquid crystal panel. A fluorescent lamp such as a cold cathode fluorescent lamp (CCFL) is mainly used as a light source of the backlight apparatus. In recent years, however, light emitting diodes (LEDs), which are superior in terms of power consumption, lifespan, color reproducibility, and environmental load, have come into use as the light source of the backlight apparatus.

A backlight apparatus (an LED backlight apparatus) that uses LEDs as a light source includes a large number of LEDs provided on a plate-shaped substrate, and is therefore capable of irradiating the color liquid crystal panel as a surface light source. However, a characteristic of an LED is that variation occurs in brightness and chromaticity among LEDs of identical types. In other words, individual differences exist among LEDs. Therefore, brightness unevenness and color unevenness occur in a light emitting surface of the LED backlight apparatus.

Japanese Patent Application Publication No. 2009-087772 discloses a technique for suppressing brightness unevenness and color unevenness in a light emitting surface of an LED backlight apparatus by combining a plurality of circuit boards (small light emitting substrates) on which LEDs are mounted.

Incidentally, in another known technique, a reduction in power consumption and an improvement in image contrast are achieved by driving the backlight apparatus in individual regions and reducing the brightness of LEDs that emit light onto regions of a display region of the liquid crystal panel in which dark images are displayed. This technique of controlling the brightness of an LED in accordance with a displayed image is known as local dimming control. In the LED backlight apparatus described in Japanese Patent Application Publication No. 2009-087772, brightness control can be performed on each small light emitting substrate by connecting a control substrate to a connector attached to each small light emitting substrate via a wire harness. Here, a wire harness refers to one or more signal wires.

SUMMARY OF THE INVENTION

However, when a wire harness is used to connect a small light emitting substrate to an LED control substrate, as in the related art described above, increases in component cost and manufacturing cost occur. Further, when a wire harness is used, it becomes difficult to reduce a thickness of the backlight apparatus (light source apparatus).

The present invention provides a light source apparatus which can suppress brightness unevenness and color unevenness in a light emitting surface and which can be reduced in thickness without incurring a cost increase.

A light source apparatus according to the present invention comprises:

a plurality of light emitting substrates arranged in matrix form, each having at least one light source;

an intermediate substrate provided between respective rows of the plurality of light emitting substrates; and a driving unit that outputs a drive signal for driving the light sources, wherein a first supply wiring for supplying the drive signal to the light source provided on each of the plurality of light emitting substrates is printed on each of the light emitting substrates, a first connection wiring for electrically connecting the first supply wirings printed on two light emitting substrates sandwiching the intermediate substrate is printed on the intermediate substrate, the drive signal output by the driving unit is input into a first light emitting substrate of the plurality of light emitting substrates, which is a light emitting substrate positioned on one end in a column direction, a path for supplying the drive signal to the light source of the first light emitting substrate is constituted by the first supply wiring printed on the first light emitting substrate, and a path for supplying the drive signal to the light source of a second light emitting substrate of the plurality of light emitting substrates, which is a light emitting substrate other than the first light emitting substrate, is constituted by the first supply wiring printed on the second light emitting substrate, the first supply wiring printed on a light emitting substrate positioned closer to the driving unit than the second light emitting substrate, and the first connection wiring printed on the intermediate substrate provided between the light emitting substrates.

According to the present invention, brightness unevenness and color unevenness in a light emitting surface can be suppressed and a reduction in thickness can be achieved without incurring a cost increase.

Further features of the present invention will become apparent from the following description of exemplary embodiments with reference to the attached drawings.

BRIEF DESCRIPTION OF THE DRAWINGS

FIGS. 7A to 7C show examples of an electric circuit configuration of an intermediate substrate according to the first embodiment;

FIGS. 15A to 15C show examples of an electric circuit configuration of an intermediate substrate according to the second embodiment;

FIGS. 21A and 21B show other examples of an electric circuit configuration of an intermediate substrate.

DESCRIPTION OF THE EMBODIMENTS (First Embodiment)

Figure 1:
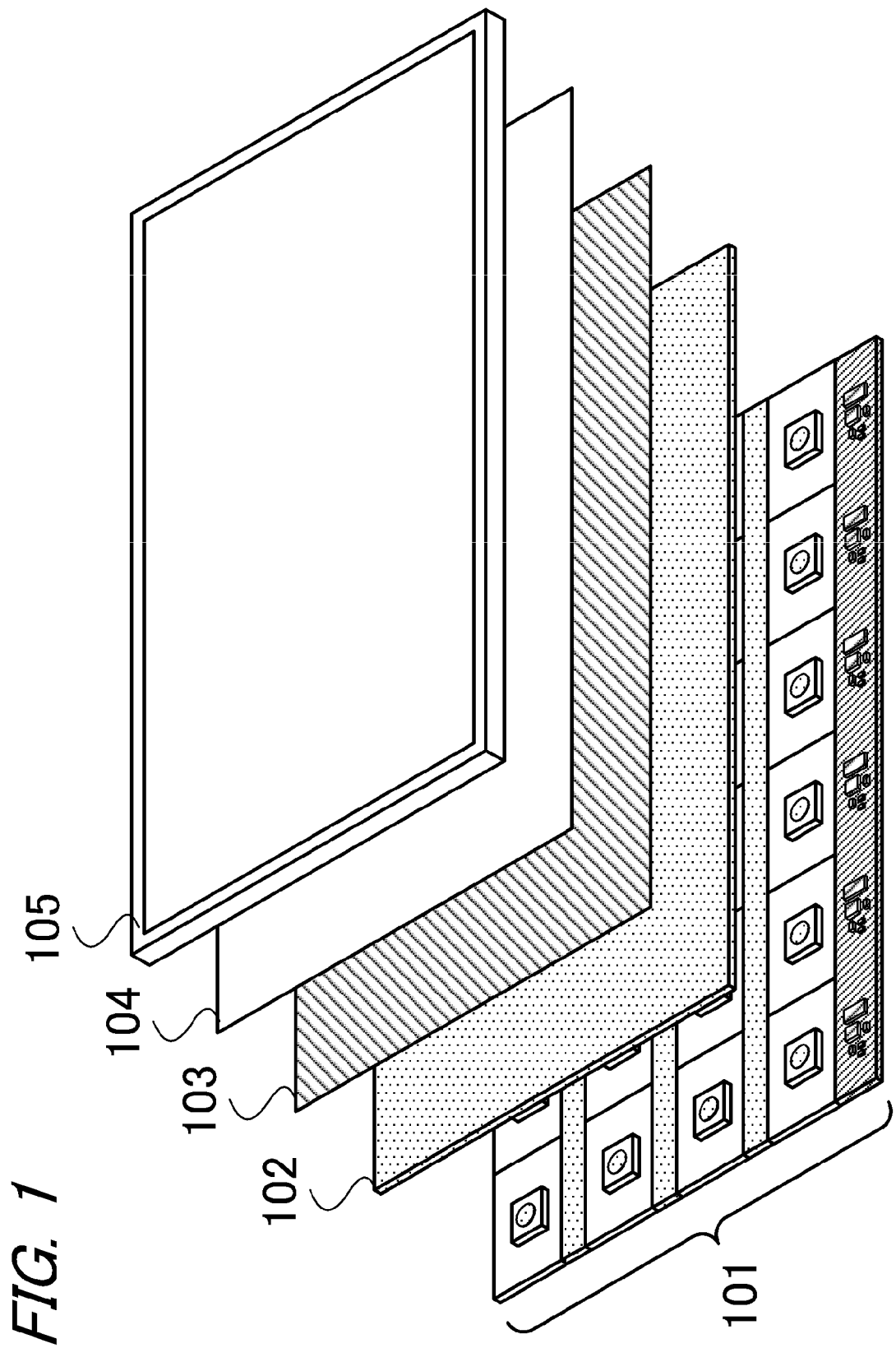
FIG. 1 shows an example of a configuration of a color image display apparatus according to first to third embodiments.

FIG. 1 is a pattern diagram showing an example of a configuration of a color image display apparatus to which the present invention can be applied. The color image display apparatus includes an LED backlight apparatus 101, a diffuser plate 102, a condensing sheet 103, a reflection type polarization film 104, and a color liquid crystal panel 105.

The LED backlight apparatus 101 is a light source apparatus (a backlight apparatus) that emits light (white light) onto a back surface of the color liquid crystal panel 105. The LED backlight apparatus 101 includes a plurality of LEDs serving as point light sources.

The diffuser plate 102 causes the LED backlight apparatus 101 to function as a surface light source by diffusing light from the plurality of LEDs.

The condensing sheet 103 improves a brightness (an on-screen brightness; a front brightness) of an image displayed on the color liquid crystal panel 105 by condensing the white light that is diffused by the diffuser plate 102 so as to enter at various entrance angles in a front surface direction (toward the color liquid crystal panel 105 side).

The reflection type polarization film 104 improves the front brightness by polarizing the incident white light efficiently.

The color liquid crystal panel 105 includes a plurality of pixels constituted by R sub-pixels that transmit red light, G sub-pixels that transmit green light, and B sub-pixels that transmit blue light, and displays a color image by controlling the brightness of the emitted white light in each sub-pixel.

Figure 2:
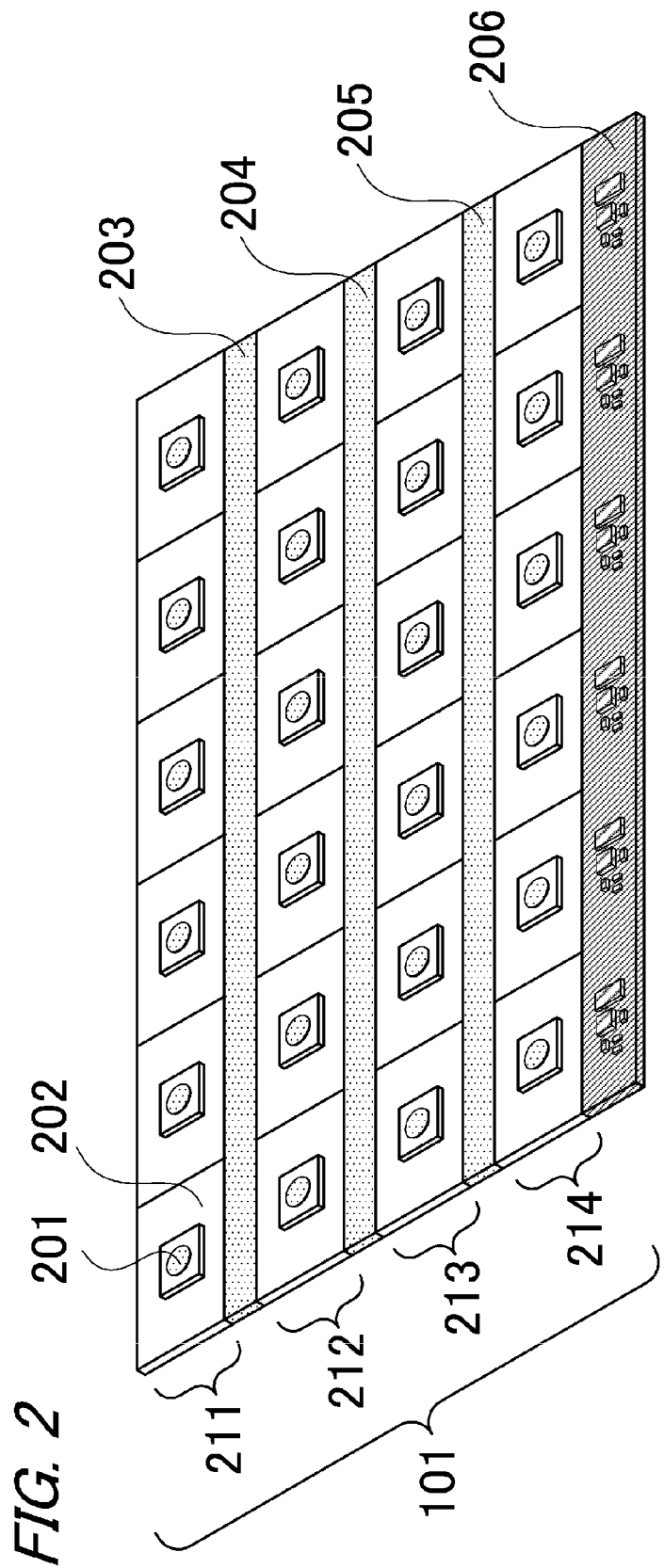
FIG. 2 shows an example of a configuration of an LED backlight apparatus according to the first embodiment.

FIG. 2 is a pattern diagram showing an example of a configuration of the LED backlight apparatus 101.

The LED backlight apparatus 101 includes a plurality of small light emitting substrates 202, intermediate substrates 203 to 205, and a control substrate 206.

The plurality of small light emitting substrates 202 are arranged in the shape of a matrix, and each includes at least one light source. In this embodiment, the LED backlight apparatus 101 includes a total of twenty-four small light emitting substrates 202, i.e. six in a row direction and four in a column direction (in other words, four rows and six columns). Further, a single LED 201 is mounted on each small light emitting substrate 202.

The intermediate substrates 203 to 205 are provided between the respective rows of the plurality of small light emitting substrates. More specifically, a small light emitting substrate group 211 forming a first row and a small light emitting substrate group 212 forming a second row are connected by the intermediate substrate 203, the small light emitting substrate group 212 forming the second row and a small light emitting substrate group 213 forming a third row are connected by the intermediate substrate 204, and the small light emitting substrate group 213 forming the third row and a small light emitting substrate group 214 forming a fourth row are connected by the intermediate substrate 205.

The control substrate 206 is provided on a column direction edge of the plurality of small light emitting substrates. More specifically, the control substrate 206 is connected to an opposite side of the small light emitting substrate group 214 forming the fourth row to the intermediate substrate 205. Further, the control substrate 206 includes a driving unit and a control unit (neither of which is shown in the drawing). The driving unit outputs a drive signal to drive the light sources (LEDs). The drive signal output by the driving unit is input into small light emitting substrates (first small light emitting substrates; the small light emitting substrate group 214) positioned on one end of the column direction, from among the plurality of small light emitting substrates. The control unit outputs a control signal to control a light emitting brightness of the light sources. The control signal output by the control unit is input into the first small light emitting substrates (the small light emitting substrate group 214).

Figure 3:
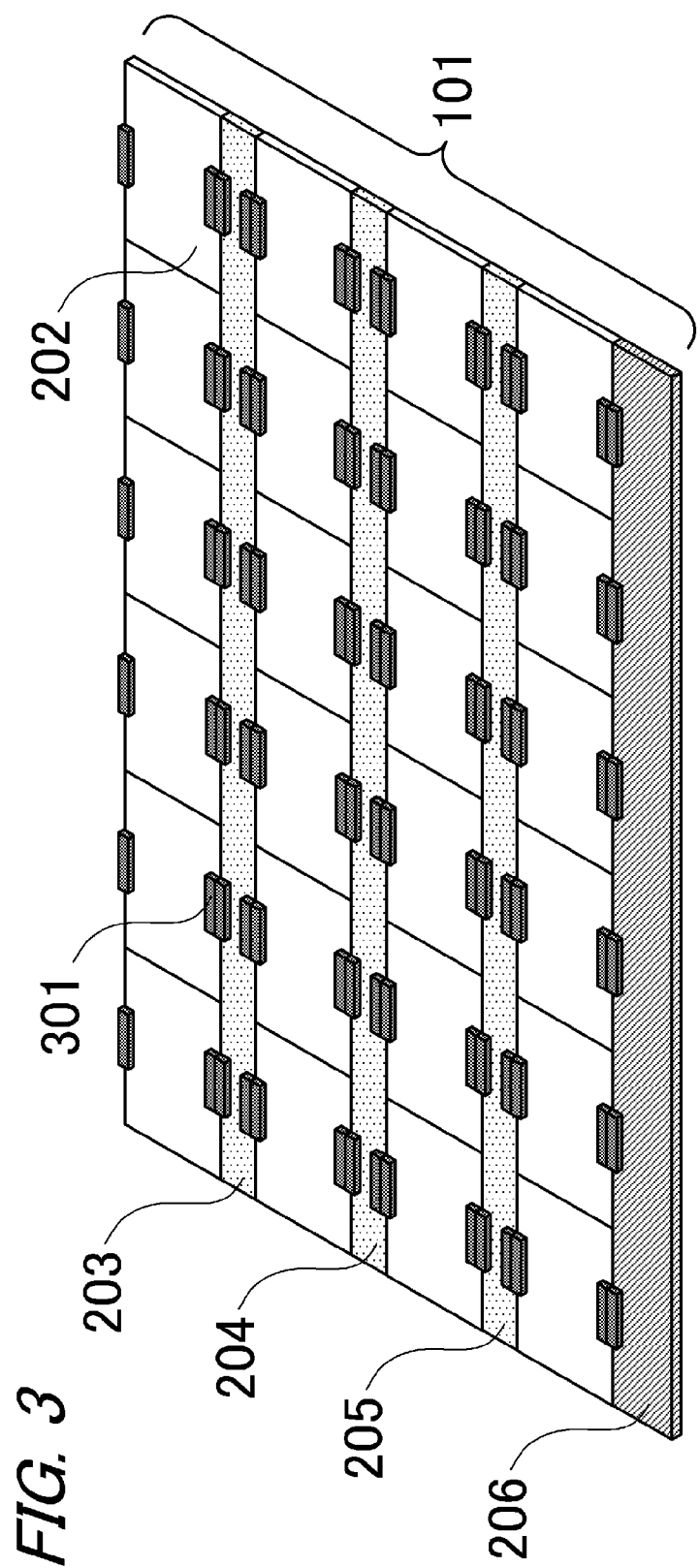
FIG. 3 shows an example of the configuration of the LED backlight apparatus according to the first embodiment.

FIG. 3 is a pattern diagram showing an example of the configuration of the LED backlight apparatus 101 in a case where the LED backlight apparatus 101 shown in FIG. 2 is seen from a back surface side (an opposite side to the color liquid crystal panel 105).

Connectors 301 for establishing connections to other substrates are provided on a back surface side of the small light emitting substrates 202, the intermediate substrates 203 to 205, and the control substrate 206. In this embodiment, wiring is printed on each substrate, and using the connectors 301, the wiring printed on one of two adjacent substrates in the column direction is electrically connected to the wiring printed on the other substrate without the need for a wire harness. Here, the reason why the connectors 301 are not provided on a front surface side (the color liquid crystal panel 105 side) of the substrates is to ensure that the light from the LEDs 201 is not obstructed.

Figure 4:
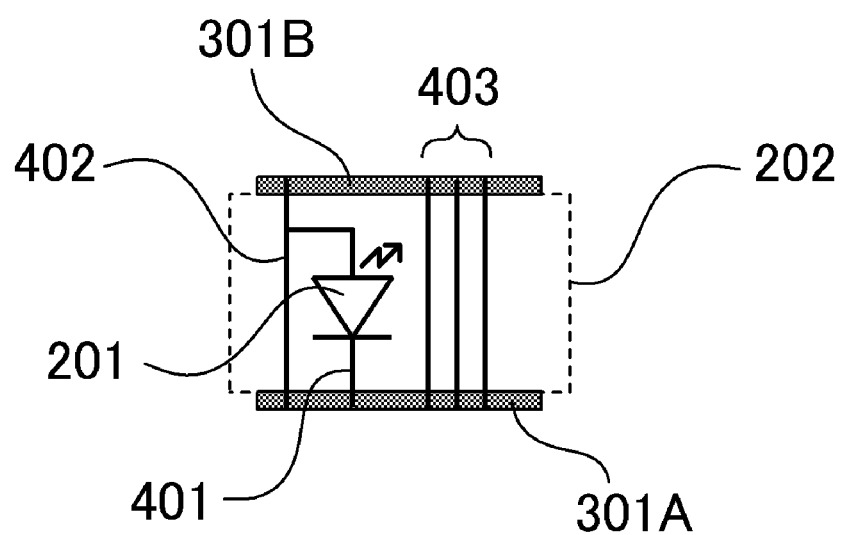
FIG. 4 shows an example of an electric circuit configuration of a small light emitting substrate according to the first embodiment.

FIG. 4 is a pattern diagram showing an example of an electric circuit configuration of the small light emitting substrate 202.

In this embodiment, the plurality of small light emitting substrates are assumed to have identical mounted components and printed wiring.

The small light emitting substrate 202 includes connectors 301A, 301B for electrically connecting the wiring printed on the small light emitting substrate 202 to the wiring printed on another substrate. More specifically, the connector 301A is provided on an end of the small light emitting substrate 202 on an opposite side to the control substrate 206. The connector 301B is provided on a control substrate 206 side end of the small light emitting substrate 202.

A constant voltage wire 402 (a first supply wiring) that supplies a drive signal (a constant voltage) to the LED 201 provided on the small light emitting substrate 202 is printed on the small light emitting substrate 202. More specifically, the constant voltage wire 402 is printed such that the constant voltage is input from the connector 301A and supplied to an anode electrode of the LED 201, and such that the constant voltage is input from the connector 301A and output from the connector 301B.

Further, a control signal wire 401 (a second supply wiring) that supplies a control signal to the LED 201 provided on the small light emitting substrate 202 is printed on the small light emitting substrate 202. More specifically, the control signal wire 401 is printed such that the control signal is input from the connector 301A and supplied to a cathode electrode of the LED 201.

Furthermore, a control signal transmission wire 403 (a first transmission wiring) for transmitting the control signal is printed on the small light emitting substrate 202. More specifically, the control signal transmission wire 403 is printed such that the control signal is input from the connector 301A and output from the connector 301B.

Incidentally, in FIG. 4 the plurality of wirings described above appear to be printed on a single (single-layer) substrate. However, a multilayer substrate may be used such that a part of the plurality of wirings described above is printed on a different layer to the other wirings.

Figure 5A:
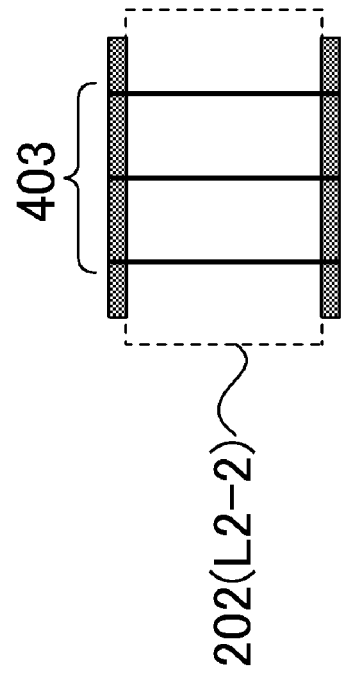
FIGS. 5A and 5B show examples of the electric circuit configuration of the small light emitting substrate according to the first embodiment.
Figure 5B:
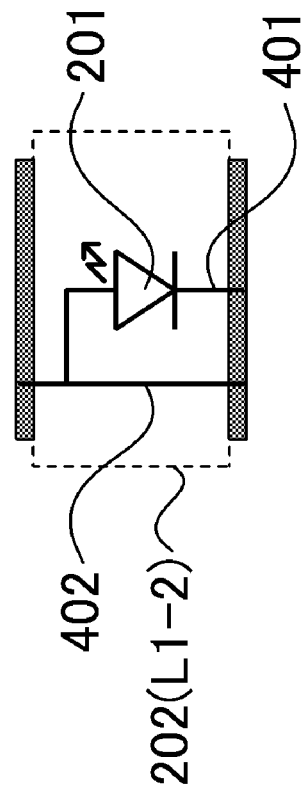

FIGS. 5A and 5B are pattern diagrams showing examples of the electric circuit configuration of the small light emitting substrate 202 when a double-sided (two-layer) substrate is used.

As shown in FIG. 5A, the LED 201 is mounted and the control signal wire 401 and constant voltage wire 402 are printed on a first layer 202 (L1-2) of the small light emitting substrate.

As shown in FIG. 5B, the control signal transmission wire 403 is printed on a second layer 202 (L2-2) of the small light emitting substrate.

By dividing the plurality of wirings into two are printing the respective wirings on different substrate layers, as described above, a sufficient wiring width can be secured in each wiring and a sufficient wiring interval can be secured between the wirings. As a result, an improvement in electrical reliability is achieved.

FIGS. 6A to 6D are pattern diagrams showing examples of the electric circuit configuration of the small light emitting substrate 202 when a four-layer substrate is used.

Figure 6A:
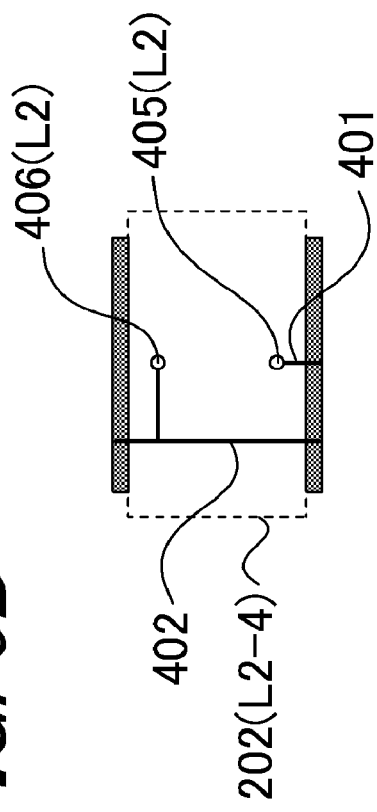
FIGS. 6A to 6D show examples of the electric circuit configuration of the small light emitting substrate according to the first embodiment.

As shown in FIG. 6A, the LED 201 is mounted on a first layer 202 (L1-4) of the small light emitting substrate. A via 405 (L1) that is electrically connected to the cathode electrode of the LED 201 is provided on the first layer 202 (L1-4). A via 406 (L1) that is electrically connected to the anode electrode of the LED 201 is provided on the first layer 202 (L1-4). Further, a heat discharge pad 404 for efficiently discharging heat from the LED 201 is provided on the first layer 202 (L1-4).

Figure 6B:
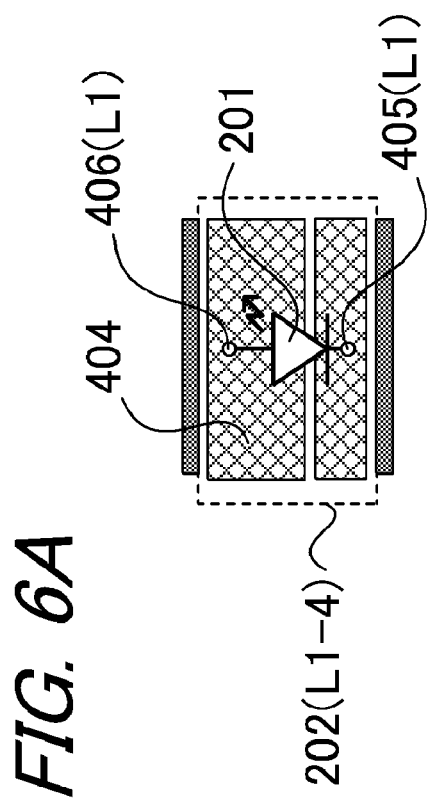

As shown in FIG. 6B, the control signal wire 401 and the constant voltage wire 402 are printed on a second layer 202 (L2-4) of the small light emitting substrate. A via 405 (L2) that is electrically connected to the control signal wire 401 is provided on the second layer 202 (L2-4) of the small light emitting substrate. A via 406 (L2) that is electrically connected to the constant voltage wire 402 is provided on the second layer 202 (L2-4) of the small light emitting substrate. Here, the via 405 (L2) is provided in a position corresponding to the via 405 (L1) and electrically connected thereto. The via 406 (L2) is provided in a position corresponding to the via 406 (L1) and electrically connected thereto. As a result, the control signal wire 401 is electrically connected to the cathode electrode of the LED 201 via the via 405 (L2) and the via 405 (L1), while the constant voltage wire 402 is electrically connected to the anode electrode of the LED 201 via the via 406 (L2) and the via 406 (L1).

Figure 6C:
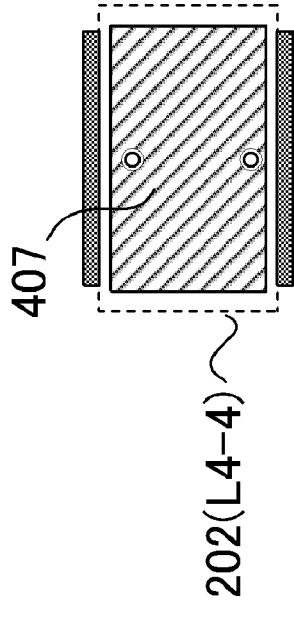

As shown in FIG. 6C, the control signal transmission wire 403 is printed on a third layer 202 (L3-4) of the small light emitting substrate.

Figure 6D:

As shown in FIG. 6D, a solid grounding surface 407 is provided on a fourth layer 202 (L4-4) of the small light emitting substrate. The solid grounding surface 407 prevents discharge of electromagnetic noise.

By employing a four-layer substrate as described above, in addition to securing a sufficient wiring width in each wiring and a sufficient wiring interval between the wirings, the heat discharge pad 404 and the solid grounding surface 407 can be provided, enabling a further improvement in electrical reliability.

FIGS. 7A to 7C are pattern diagram showing examples of electric circuit configurations of the intermediate substrate 203, the intermediate substrate 204, and the intermediate substrate 205, respectively.

As shown in FIG. 7A, the intermediate substrate 203 includes connectors 504A, 504B for electrically connecting the wiring printed on the intermediate substrate 203 to the wiring printed on another substrate.

A constant voltage transmission wire 501 (a first connection wiring) for electrically connecting the constant voltage wires 402 printed on the two small light emitting substrates sandwiching the intermediate substrate 203 is printed on the intermediate substrate 203. In other words, the constant voltage transmission wire 501 printed on the intermediate substrate 203 electrically connects the constant voltage wire 402 printed on a small light emitting substrate of the small light emitting substrate group 212 to the constant voltage wire 402 printed on a small light emitting substrate of the small light emitting substrate group 211.

Further, a control signal transmission wire 502 (a second connection wiring) is printed on the intermediate substrate 203. The control signal transmission wire 502 electrically connects the control signal transmission wire 403 printed on a small light emitting substrate close to the control unit (the control substrate 206), from among the two small light emitting substrates sandwiching the intermediate substrate 203, to the control signal wire 401 printed on the small light emitting substrate far from the control unit, from among the two small light emitting substrates sandwiching the intermediate substrate 203. Here, "far from" and "close to" are based on an electrical distance. In other words, the control signal transmission wire 502 printed on the intermediate substrate 203 electrically connects the control signal transmission wire 403 printed on a small light emitting substrate of the small light emitting substrate group 212 to the control signal wire 401 printed on a small light emitting substrate of the small light emitting substrate group 211.

As shown in FIG. 7B, the intermediate substrate 204 includes connectors 505A, 505B for electrically connecting the wiring printed on the intermediate substrate 204 to the wiring printed on another substrate.

The constant voltage transmission wire 501 and the control signal transmission wire 502 are printed on the intermediate substrate 204.

Further, a control signal transmission wire 503 (a third connection wiring) that electrically connects the control signal transmission wires 403 printed on the two small light emitting substrates sandwiching the intermediate substrate 204 is printed on the intermediate substrate 204. In other words, the control signal transmission wire 503 printed on the intermediate substrate 204 electrically connects the control signal transmission wire 403 printed on a small light emitting substrate of the small light emitting substrate group 213 to the control signal transmission wire 403 printed on a small light emitting substrate of the small light emitting substrate group 212.

As shown in FIG. 7C, the intermediate substrate 205 includes connectors 506A, 506B for electrically connecting the wiring printed on the intermediate substrate 205 to the wiring printed on another substrate.

The constant voltage transmission wire 501, the control signal transmission wire 502, and the control signal transmission wire 503 are printed on the intermediate substrate 205.

Hence, the control signal transmission wire 503 is printed on the intermediate substrates 204, 205 other than the intermediate substrate 203 located furthest from the control unit (the control substrate 206).

Figure 8:
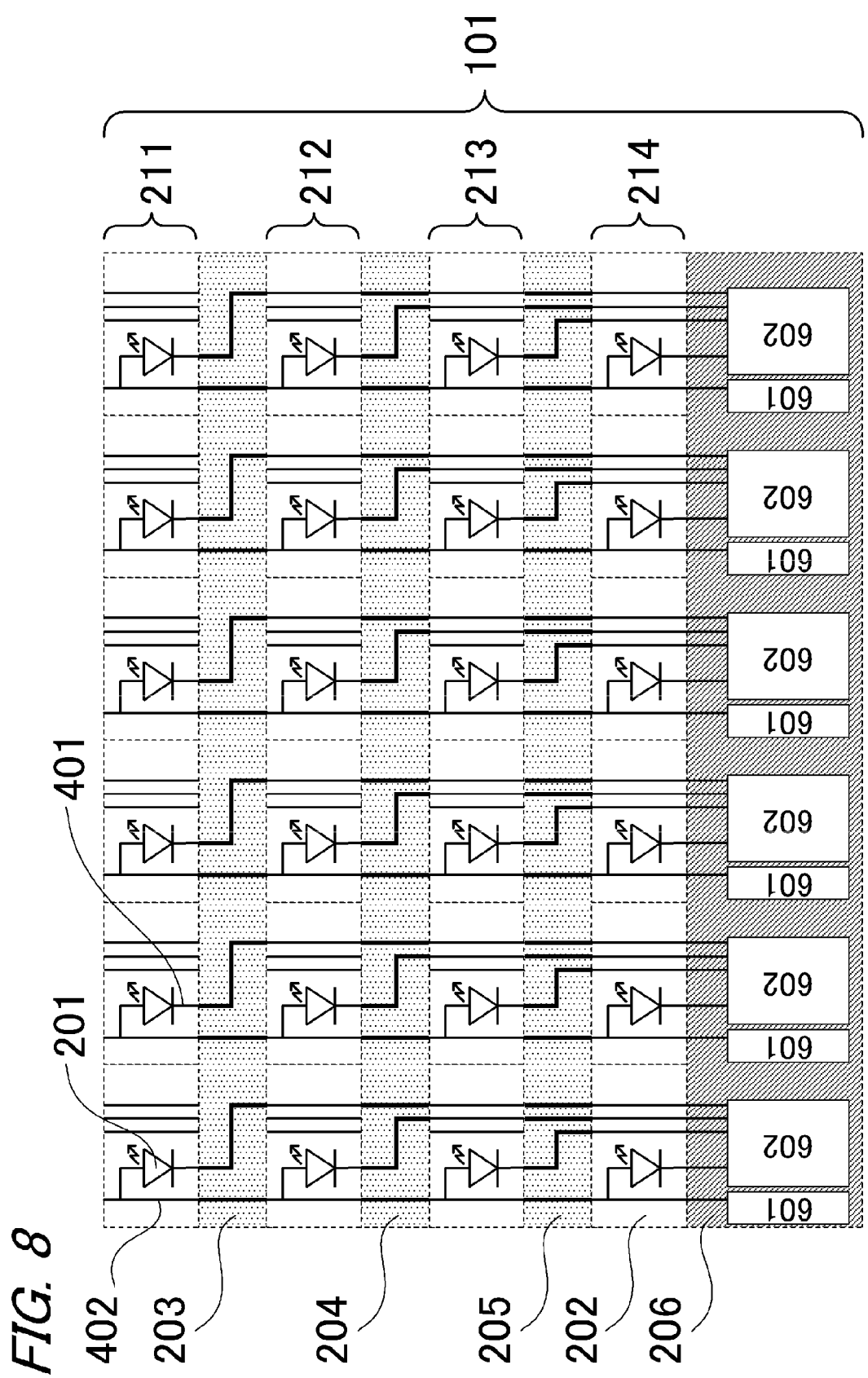
FIG. 8 shows an example of an overall electric circuit configuration of the LED backlight apparatus according to the first embodiment.

FIG. 8 is a pattern diagram showing an example of an overall electric circuit configuration of the LED backlight apparatus 101.

The control substrate 206 includes a constant voltage source 601 (the driving unit) and a constant current driver 602 (the control unit). The constant voltage source 601 and the constant current driver 602 are provided for each column of the small light emitting substrates. The following description will focus on a single column.

The constant voltage source 601 supplies a constant voltage to the constant voltage wire 402 of a small light emitting substrate (a first small light emitting substrate; a small light emitting substrate of the small light emitting substrate group 214) positioned on one end of the column direction, from among the plurality of small light emitting substrates, via the connector 301A.

The constant current driver 602 supplies a control signal to the control signal wire 401 and the control signal transmission wire 403 of the first small light emitting substrate via the connector 301A.

As shown in FIG. 8, a path for supplying a drive signal to the LED 201 of the first small light emitting substrate (the small light emitting substrate of the small light emitting substrate group 214) is constituted by the constant voltage wire 402 printed on the first small light emitting substrate.

A path for supplying a drive signal to the LED 201 of a second small light emitting substrate, from among the plurality of small light emitting substrates, which is a small light emitting substrate other than the first small light emitting substrate, is constituted by the constant voltage wire 402 printed on the second small light emitting substrate, the constant voltage wire 402 printed on the small light emitting substrate positioned closer to the driving unit than the second small light emitting substrate, and the constant voltage transmission wire 501 printed on the intermediate substrate provided between these small light emitting substrates. In this embodiment, the small light emitting substrates of the small light emitting substrate groups 211 to 213 correspond to the second small light emitting substrate.

More specifically, a path for supplying a drive signal to the LED 201 of the small light emitting substrate in the small light emitting substrate group 213 is constituted by the constant voltage wires 402 of the small light emitting substrates in the small light emitting substrate groups 213, 214 and the constant voltage transmission wire 501 of the intermediate substrate 205. Similarly, a path for supplying a drive signal to the LED 201 of the small light emitting substrate in the small light emitting substrate group 212 is constituted by the constant voltage wires 402 of the small light emitting substrates in the small light emitting substrate groups 212 to 214 and the constant voltage transmission wires 501 of the intermediate substrates 204, 205. A path for supplying a drive signal to the LED 201 of the small light emitting substrate in the small light emitting substrate group 211 is constituted by the constant voltage wire 402 of the small light emitting substrates in the small light emitting substrate groups 211 to 214 and the constant voltage transmission wires 501 of the intermediate substrates 203 to 205.

A path for supplying a control signal to the LED 201 of the first small light emitting substrate (the small light emitting substrate of the small light emitting substrate group 214) is constituted by the control signal wire 401 printed on the first small light emitting substrate.

A path for supplying a control signal to the LED 201 of a third small light emitting substrate, from among the plurality of small light emitting substrates, which is a small light emitting substrate on an adjacent row to the first small light emitting substrate, is constituted by the control signal wire 401 printed on the third small light emitting substrate, the control signal transmission wire 403 printed on the first small light emitting substrate, and the control signal transmission wire 502 printed on the intermediate substrate between these small light emitting substrates. In this embodiment, the small light emitting substrate of the small light emitting substrate group 213 corresponds to the third small light emitting substrate.

More specifically, a path for supplying a control signal to the LED 201 of the small light emitting substrate in the small light emitting substrate group 213 is constituted by the control signal wire 401 printed on the small light emitting substrate of the small light emitting substrate group 213, the control signal transmission wire 403 printed on the small light emitting substrate of the small light emitting substrate group 214, and the control signal transmission wire 502 printed on the intermediate substrate 205.

A path for supplying a control signal to the LED 201 of a fourth small light emitting substrate, from among the plurality of small light emitting substrates, which is a small light emitting substrate positioned further from the control unit than the third small light emitting substrate, is constituted by the control signal wire 401 printed on the fourth small light emitting substrate, the control signal transmission wire 502 printed on the intermediate substrate adjacent to a control unit side of the fourth small light emitting substrate, the control signal transmission wires 403 printed on the small light emitting substrates positioned closer to the control unit than the fourth small light emitting substrate, and the control signal transmission wire 503 printed on the intermediate substrate provided between the small light emitting substrates positioned closer to the control unit than the fourth small light emitting substrate. In this embodiment, the small light emitting substrates of the small light emitting substrate groups 211, 212 correspond to the fourth small light emitting substrate.

More specifically, a path for supplying a control signal to the LED 201 of the small light emitting substrate in the small light emitting substrate group 212 is constituted by the control signal wire 401 printed on the small light emitting substrate of the small light emitting substrate group 212, the control signal transmission wire 502 printed on the intermediate substrate 204, the control signal transmission wires 403 printed on the small light emitting substrates of the small light emitting substrate groups 213, 214, and the control signal transmission wire 503 printed on the intermediate substrate 205. Similarly, a path for supplying a control signal to the LED 201 of the small light emitting substrate in the small light emitting substrate group 211 is constituted by the control signal wire 401 printed on the small light emitting substrate of the small light emitting substrate group 211, the control signal transmission wire 502 printed on the intermediate substrate 203, the control signal transmission wires 403 printed on the small light emitting substrates of the small light emitting substrate groups 212 to 214, and the control signal transmission wires 503 printed on the intermediate substrates 204, 205.

Note that in the example shown in FIG. 8, the paths for supplying control signals to the LEDs 201 are provided independently for each LED 201 (each small light emitting substrate 202). Therefore, with the configuration shown in FIG. 8, the light emitting brightness of each LED 201 can be adjusted individually.

As described above, with the light source apparatus (backlight apparatus) according to this embodiment, wiring is printed on each substrate, and by combining the respective substrates, paths for supplying drive signals to the light sources and paths for supplying control signals to the light sources can be formed without using a wire harness. As a result, brightness unevenness and color unevenness in a light emitting surface can be suppressed and a reduction in thickness can be achieved without incurring a cost increase.

Note that the light source apparatus is not limited to a backlight apparatus used in a color image display apparatus, and any light source apparatus that emits light may be used.

In this embodiment, the drive signal and the control signal are supplied to the light source. However, the control signal need not be supplied, and in this case, the wiring along which the control signal flows need not be printed on the substrates.

In this embodiment, the plurality of small light emitting substrates are assumed to have identical mounted components and printed wiring, but the mounted components and wiring need not be identical in all of the small light emitting substrates. For example, the mounted components and wiring may be different on each row of the plurality of small light emitting substrates. More specifically, in the example of FIG. 8, a signal is not transmitted over the control signal transmission wire 403 of the small light emitting substrate (the small light emitting substrate of the small light emitting substrate group 211) furthest from the control unit, and therefore the corresponding wiring does not have to be printed. In other words, the control signal transmission wire 403 (the first transmission wiring) need only be printed at least on the small light emitting substrates, from among the plurality of small light emitting substrates, other than the small light emitting substrate furthest from the control unit. Note, however, that when the small light emitting substrates are all configured identically, manufacture, selection of substrates having LEDs with similar light emitting characteristics, and so on become easier.

In this embodiment, a single intermediate substrate connects the small light emitting substrates in all of the columns. However, the present invention is not limited to this configuration, and intermediate substrates may be provided for each small light emitting substrate in a plurality of columns. As shown in FIG. 21A, for example, the intermediate substrate 203 of FIG. 7A may be divided into two intermediate substrates (sub-intermediate substrates) adjacent to each other in the row direction. Note that the number of divisions is not limited to two (the number of divisions may be larger than two, for example three, five, eight, and so on). The intermediate substrate may also be provided for each column of small light emitting substrates.

In this embodiment, the paths for supplying control signals to the LEDs 201 are formed independently for each LED 201 (small light emitting substrate 202), but the present invention is not limited to this configuration, and the paths for supplying control signals to the LEDs 201 may be partially shared among the LEDs 201 (small light emitting substrates 202).

In this embodiment, a case in which an LED that emits white light is used as the light source was described, but the light source is not limited thereto, and an LED that emits red light, an LED that emits green light, or an LED that emits blue light, for example, may be used instead.

In this embodiment, the backlight apparatus includes a total of twenty-four small light emitting substrates, i.e. six in the row direction and four in the column direction. However, the present invention is not limited to this configuration, and the backlight apparatus may include a total of two small light emitting substrates, i.e. one in the row direction and two in the column direction, for example. The backlight apparatus may also include a total of twenty-five small light emitting substrates, i.e. five in the row direction and five in the column direction. The backlight apparatus may also include a total of twenty-four small light emitting substrates constituted by eight in the row direction and three in the column direction. When the number of rows of the plurality of small light emitting substrates is two, an intermediate substrate printed with the first connection wiring and the second connecting wiring (the constant voltage transmission wire 501 and the control signal transmission wire 502) is provided between the rows of the plurality of small light emitting substrates.

Figure 20:
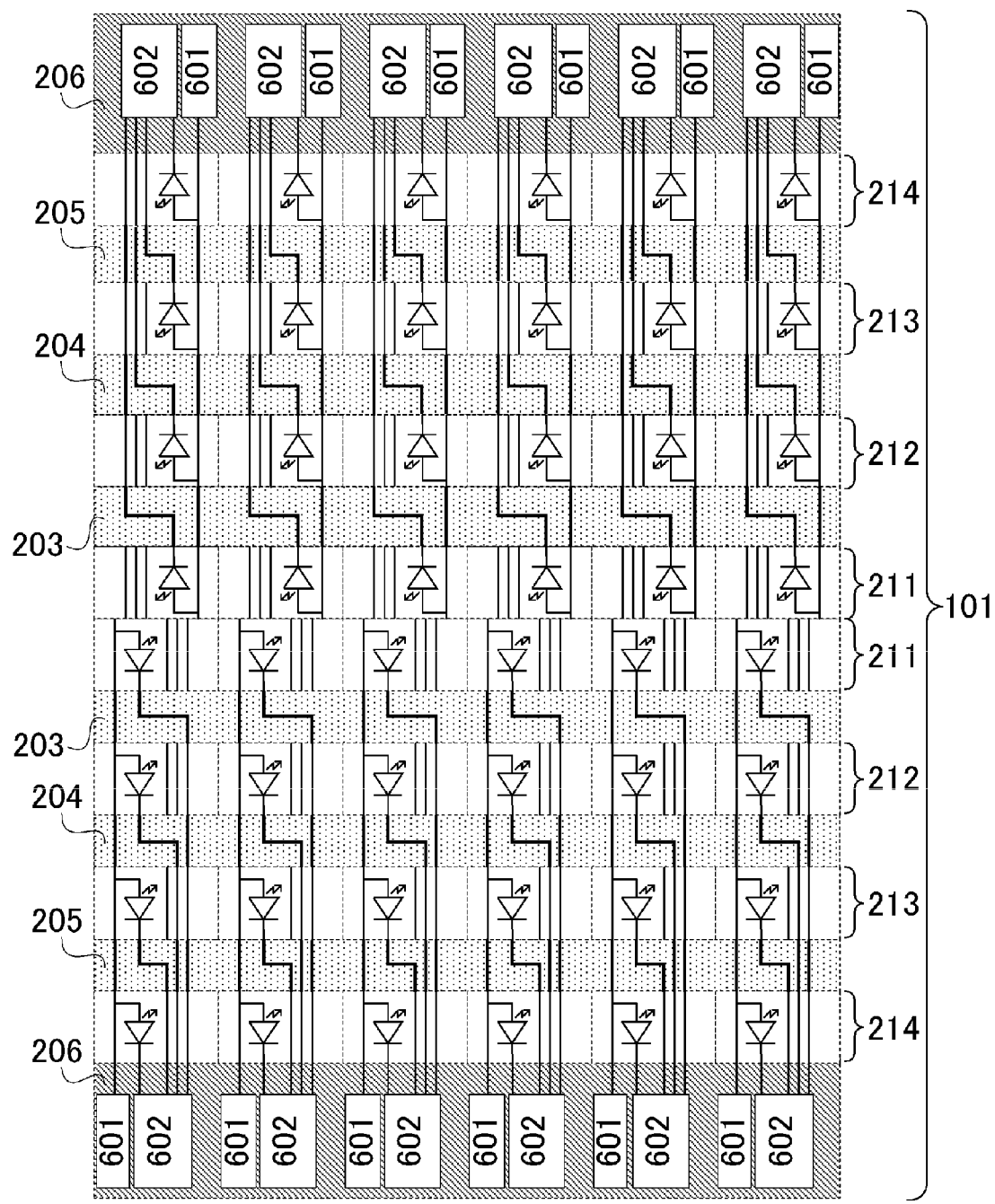
FIG. 20 shows another example of an overall electric circuit configuration of an LED backlight apparatus.

In this embodiment, the driving unit and the control unit are provided on one end of the column direction, but the present invention is not limited to this configuration, and as shown in FIG. 20, for example, the driving unit and the control unit may be provided on both ends of the column direction (a vertical direction). In the example of FIG. 20, signals from the upper end driving unit and control unit are supplied to upper half LEDs, while signals from the lower end driving unit and control unit are supplied to lower half LEDs. When a distance from the driving unit to the light source is great, a level (a voltage value) of the driving signal decreases before the driving signal reaches the light source. Similarly, when a distance from the control unit to the light source is great, a level (a current value) of the control signal decreases before the control signal reaches the light source. By employing the configuration shown in FIG. 20, such reductions in the signal level can be suppressed.

In this embodiment, a case in which a single small light emitting substrate has a single light source was described, but a single small light emitting substrate may have a plurality of light sources.

In FIG. 8, for example, a combination of four small light emitting substrates constituted by two small light emitting substrates in the row direction and two small light emitting substrates in the column direction may be used as a single small light emitting substrate. When this configuration is employed, a single small light emitting substrate includes four light sources.

Figure 9:
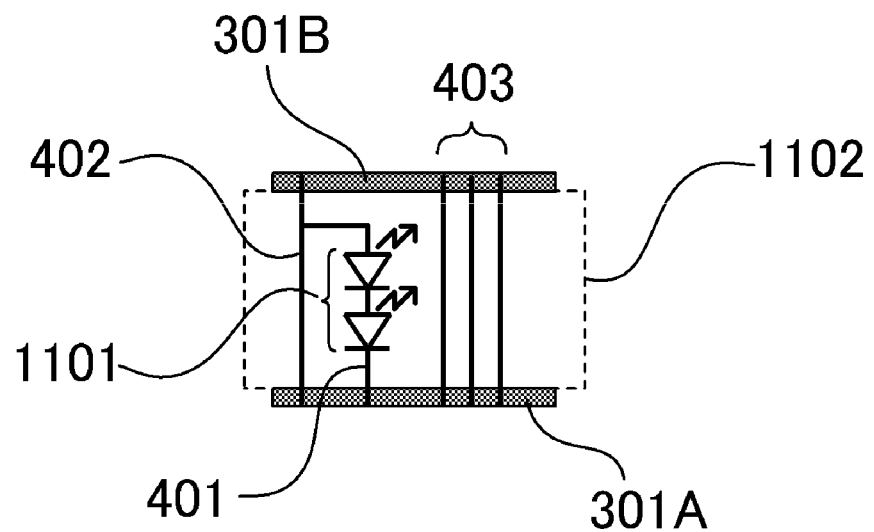
FIG. 9 shows an example of the electric circuit configuration of the small light emitting substrate according to the first embodiment.

Further, the small light emitting substrate may be configured as shown in FIG. 9. A small light emitting substrate 1102 shown in FIG. 9 includes an LED group 1101 constituted by a plurality of (two in FIG. 9) LEDs connected in series to the constant voltage wire 402 instead of the LED 201 shown in FIG. 4.

Figure 10:
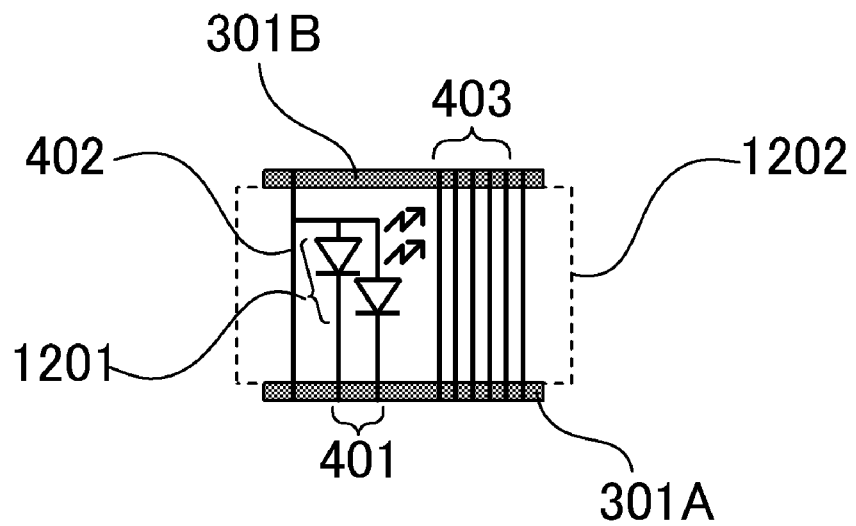
FIG. 10 shows an example of the electric circuit configuration of the small light emitting substrate according to the first embodiment.

The small light emitting substrate may also be configured as shown in FIG. 10. A small light emitting substrate 1202 shown in FIG. 10 includes an LED group 1201 constituted by a plurality of (two in FIG. 10) LEDs connected in parallel to the constant voltage wire 402 instead of the LED 201 shown in FIG. 4.

Note that the number of light sources provided on a single small light emitting substrate is not limited to one, two, or four. For example, the number of light sources provided on a single small light emitting substrate may be ten, thirty, fifty, and so on.

Figure 11A:
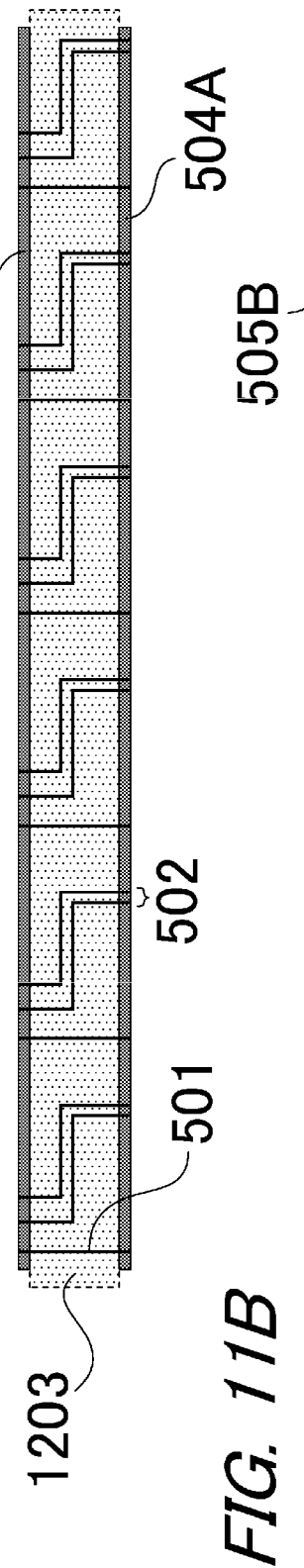
FIGS. 11A to 11C show examples of the electric circuit configuration of the intermediate substrate according to the first embodiment.
Figure 11B:
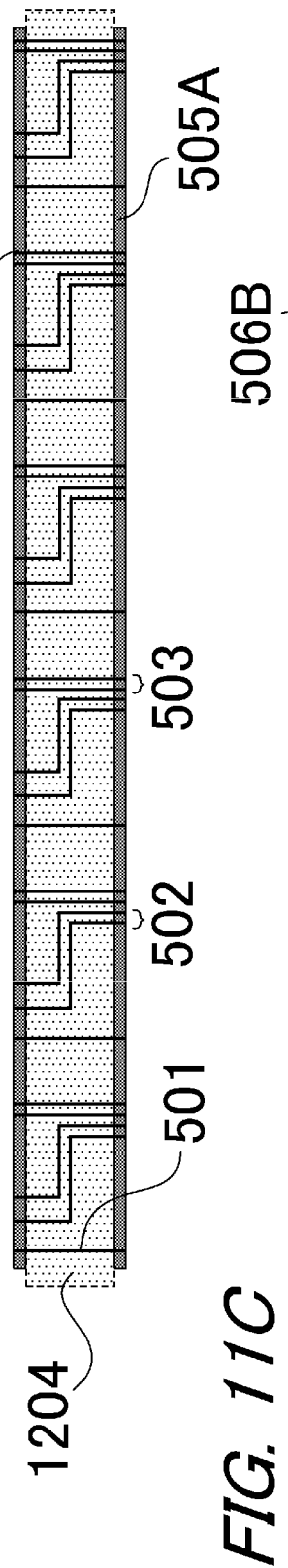
Figure 11C:
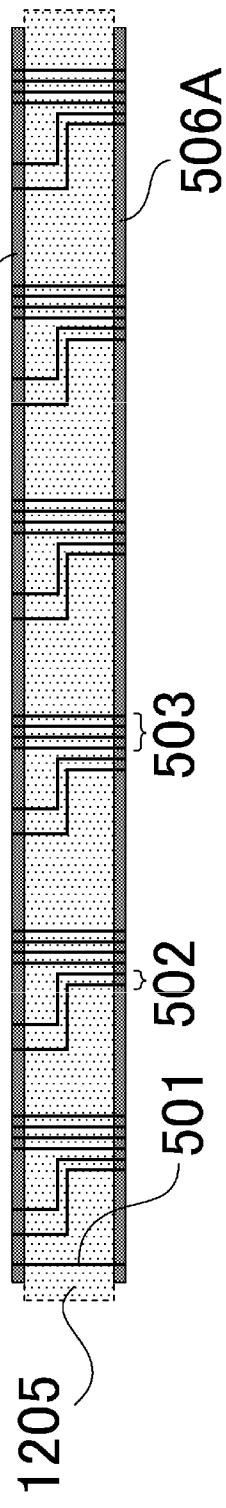
Figure 12:
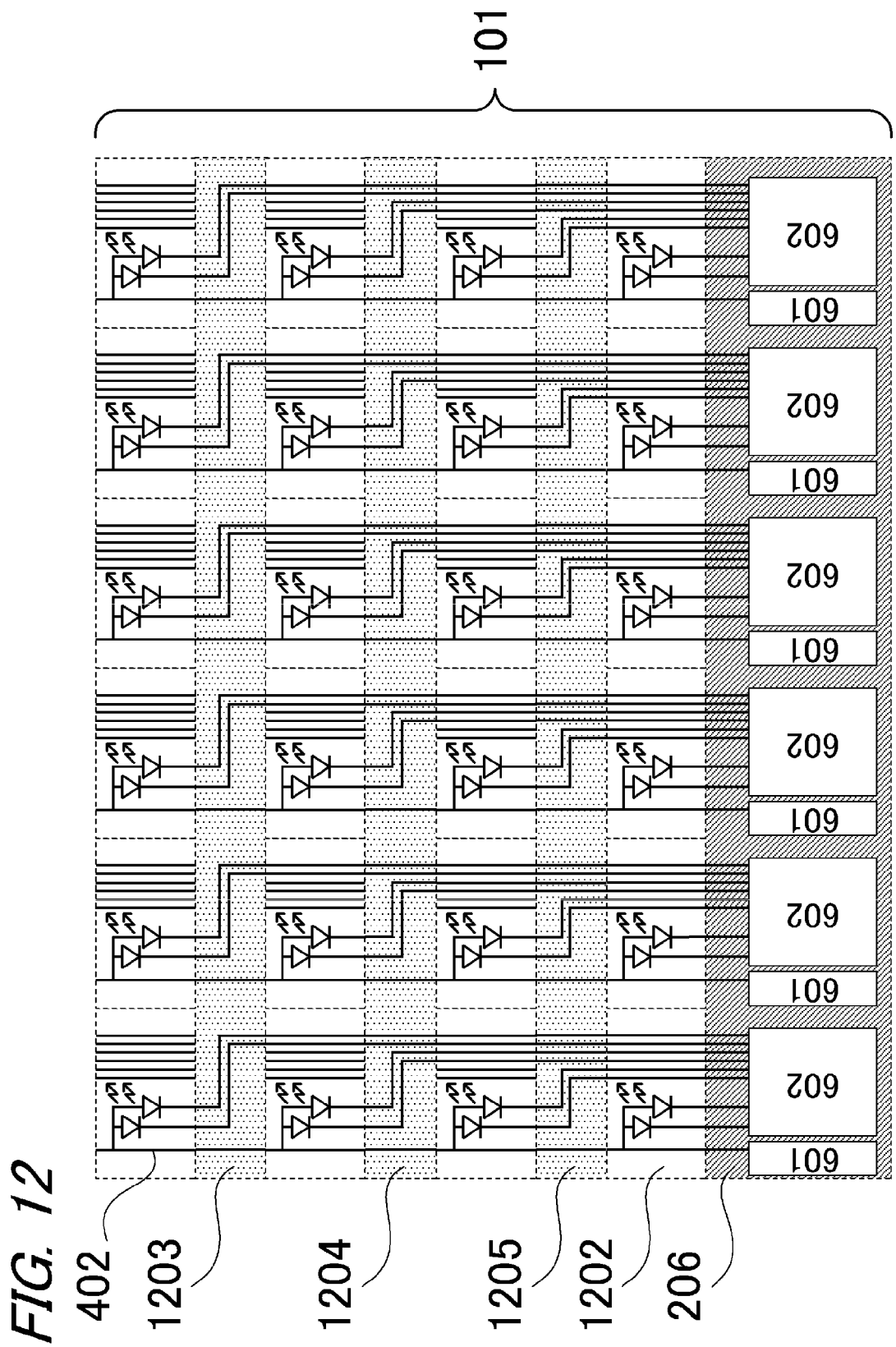
FIG. 12 shows an example of the overall electric circuit configuration of the LED backlight apparatus according to the first embodiment.

When the backlight apparatus is constructed using a total of twenty-four of the small light emitting substrates 1202, i.e. six in the row direction and four in the column direction, intermediate substrates 1203 to 1204 shown in FIGS. 11A to 11C, for example, are used. In this case, the overall circuit configuration of the backlight apparatus is as shown in FIG. 12.

As shown in FIGS. 10 and 11A to 11C, similar wiring to that of FIGS. 4 and 7A to 7C is printed on each substrate. As shown in FIG. 12, the paths for supplying drive signals to the light sources (the LEDs included in the LED group 1201) are constituted by the constant voltage wires 402 or the constant voltage wires 402 and the constant voltage transmission wires 501, similarly to FIG. 8. Further, the paths for supplying control signals to the light sources are constituted by the control signal wires 401, the control signal wires 401 and the control signal transmission wires 403, 502, or the control signal wires 401 and the control signal transmission wires 403, 502, 503, similarly to FIG. 8.

As described above, two LEDs (twice the number shown in FIG. 4) are provided on the single small light emitting substrate 1202. Hence, in the example shown in FIGS. 10, 11A to 11C, and 12, the control signal wire 401 and the control signal transmission wires 403, 502, 503 are printed in twice the numbers thereof shown in FIGS. 4, 7A to 7C, and 8 in order to control the light emitting brightness of each LED.

(Second Embodiment)

In this embodiment, a light source apparatus including a brightness sensor that measures the light emitting brightness of the light source apparatus to suppress brightness unevenness and color unevenness caused by temporal deterioration and temperature variation in the respective light sources (LEDs) will be described. A light source apparatus according to a second embodiment of the present invention will be described below. Note that in the drawings, identical reference numerals have been allocated to members that are identical to the first embodiment, and description thereof has been omitted.

Figure 13:
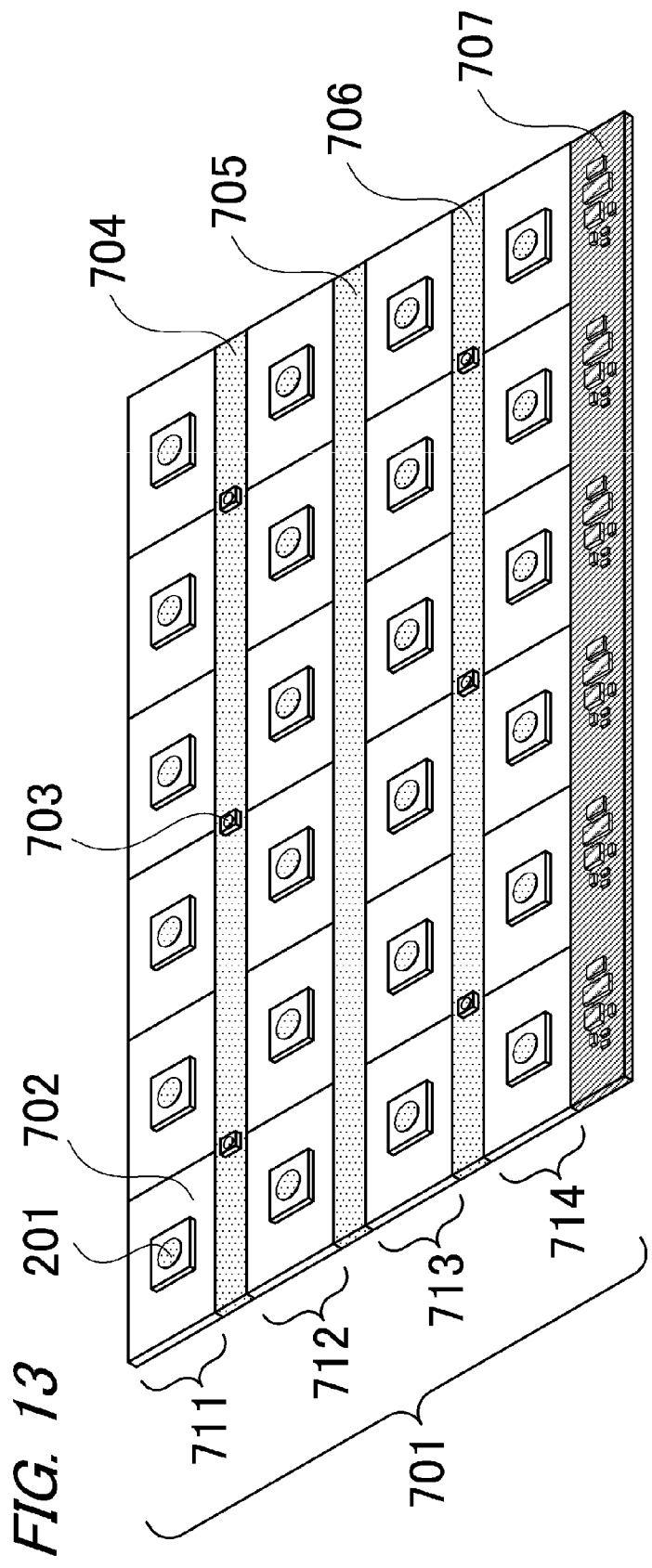
FIG. 13 shows an example of a configuration of an LED backlight apparatus according to the second embodiment.

FIG. 13 is a pattern diagram showing an example of a configuration of an LED backlight apparatus 701 according to the second embodiment of the present invention.

The LED backlight apparatus 701 according to this embodiment includes, similarly to the first embodiment, a plurality of (twenty-four) small light emitting substrates 702, intermediate substrates 704 to 706, and a control substrate 707. A small light emitting substrate group 711 forming a first row and a small light emitting substrate group 712 forming a second row are connected by the intermediate substrate 704. The small light emitting substrate group 712 forming the second row and a small light emitting substrate group 713 forming a third row are connected by the intermediate substrate 705. The small light emitting substrate group 713 forming the third row and a small light emitting substrate group 714 forming a fourth row are connected by the intermediate substrate 706.

The LED backlight apparatus 701 further includes a brightness sensor 703. More specifically, the brightness sensor 703 is provided on at least one of the intermediate substrates. In the example of FIG. 13, the brightness sensor 703 is provided on the intermediate substrate 704 and the intermediate substrate 706 (the intermediate substrates adjacent to the first small light emitting substrate (the small light emitting substrate group 714)). More specifically, one brightness sensor 703 is disposed for four small light emitting substrates 702 in a substantially central position among the four small light emitting substrates 702. Hence, in the example of FIG. 13, three brightness sensors 703 are provided on a single intermediate substrate.

Figure 14:
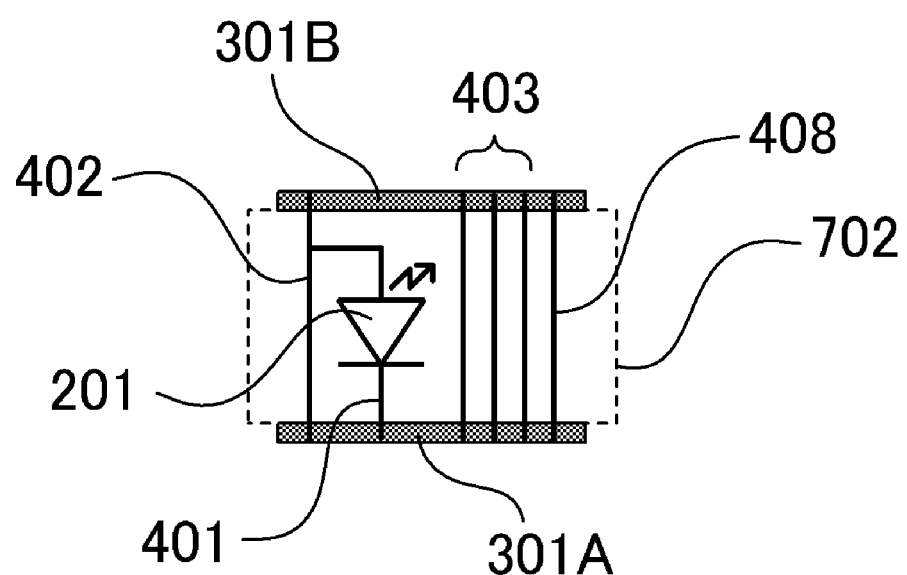
FIG. 14 shows an example of an electric circuit configuration of a small light emitting substrate according to the second embodiment.

FIG. 14 is a pattern diagram showing an electric circuit configuration of the small light emitting substrate 702.

The small light emitting substrate 702 differs from the electric circuit configuration of FIG. 4 in that a sensor signal transmission wire 408 (a second transmission wiring) for transmitting a measurement result of the brightness sensor 703 is printed thereon.

FIGS. 15A to 15C are pattern diagrams showing examples of electric circuit configurations of the intermediate substrate 704, the intermediate substrate 705, and the intermediate substrate 706, respectively.

As shown in FIG. 15A, the intermediate substrate 704 includes the brightness sensor 703.

A sensor signal wire 801 (an extraction wiring) for extracting a measurement result from the brightness sensor 703 on the intermediate substrate 704 is printed on the intermediate substrate 704. More specifically, the sensor signal wire 801 is printed such that the measurement result is extracted from the brightness sensor 703 and output from the connector 504A.

All other configurations are similar to those of the intermediate substrate 203 according to the first embodiment (FIG. 7A), and therefore description thereof has been omitted.

As shown in FIG. 15B, a sensor signal transmission wire 802 (a fourth connection wiring) for electrically connecting the sensor signal transmission wires 408 printed on the two small light emitting substrates sandwiching the intermediate substrate 705 is printed on the intermediate substrate 705. More specifically, the sensor signal transmission wire 802 is printed such that the measurement result from the brightness sensor 703 is input from the connector 505B and output from the connector 505A.

All other configurations are similar to those of the intermediate substrate 204 according to the first embodiment (FIG. 7B), and therefore description thereof has been omitted.

As shown in FIG. 15C, the intermediate substrate 706 includes the brightness sensor 703.

The sensor signal wire 801 for extracting the measurement result from the brightness sensor 703 on the intermediate substrate 706 and the sensor signal transmission wire 802 for electrically connecting the sensor signal transmission wires 408 printed on the two small light emitting substrates sandwiching the intermediate substrate 706 are printed on the intermediate substrate 706.

All other configurations are similar to those of the intermediate substrate 205 according to the first embodiment (FIG. 7C), and therefore description thereof has been omitted.

Hence, the sensor signal transmission wire 802 is printed on the intermediate substrate positioned closer to the driving unit than the intermediate substrate provided with the brightness sensor.

Note that the sensor signal transmission wire 408 need only be printed on at least the small light emitting substrate, from among the plurality of small light emitting substrates, positioned closer to the driving unit than the intermediate substrates having the brightness sensor. For example, when the brightness sensor is provided only on the intermediate substrate 706 adjacent to the first small light emitting substrate, the sensor signal transmission wire 408 may be printed only on the first small light emitting substrate.

Figure 16:
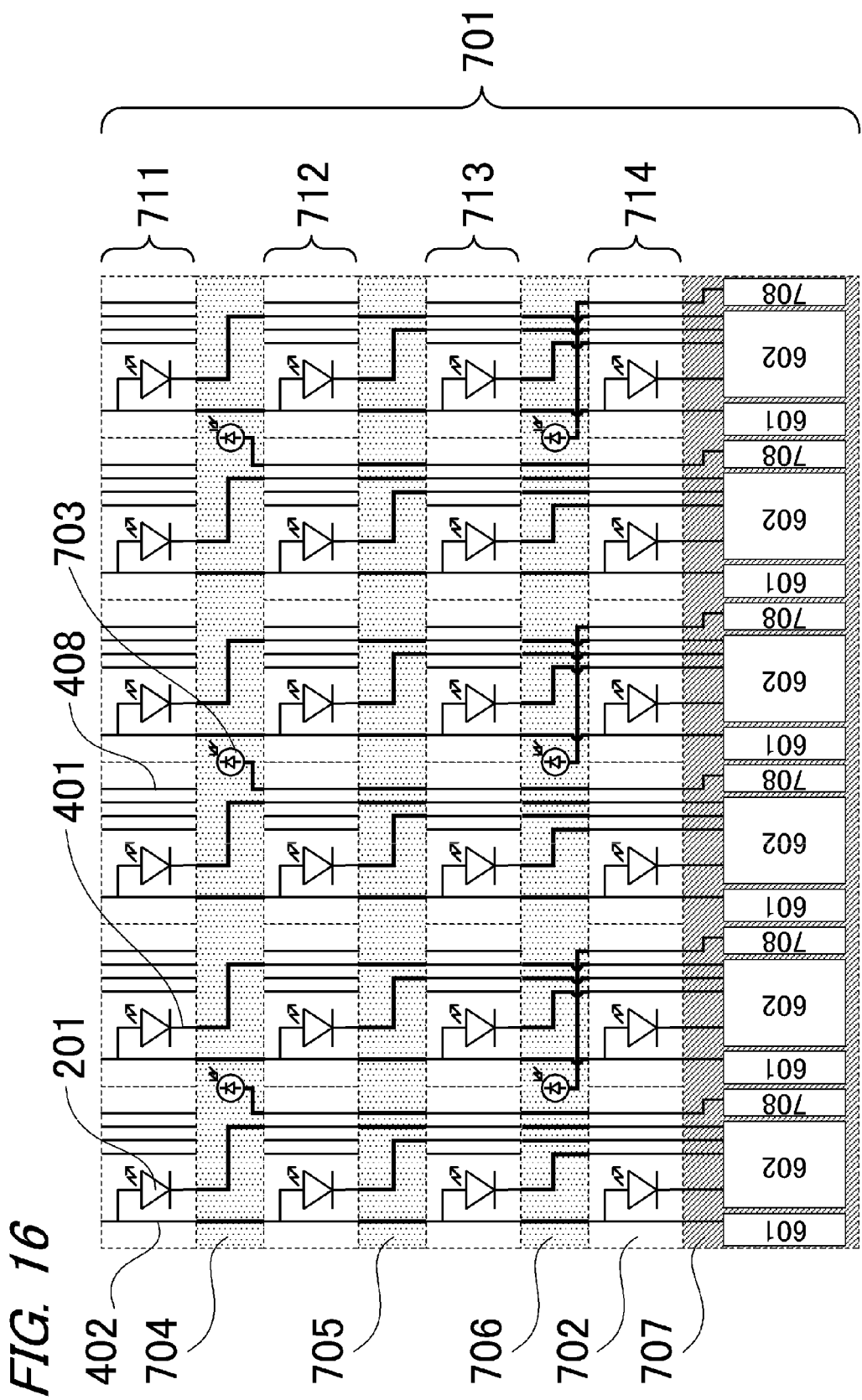
FIG. 16 shows an example of an overall electric circuit configuration of the LED backlight apparatus according to the second embodiment.

FIG. 16 is a pattern diagram showing an example of an overall electric circuit configuration of the LED backlight apparatus 701.

The control substrate 707 includes the constant voltage source 601 (the driving unit), the constant current driver 602 (the control unit), and an AD converter 708.

The constant voltage source 601 supplies a constant voltage to the constant voltage wire 402 of the small light emitting substrate (the first small light emitting substrate; the small light emitting substrate of the small light emitting substrate group 714) positioned on one end of the column direction, from among the plurality of small light emitting substrates, via the connector 301A.

The constant current driver 602 supplies a control signal to the control signal wire 401 and the control signal transmission wire 403 of the first small light emitting substrate via the connector 301A.

The measurement result of the brightness sensor 703 is input into the AD converter 708 from the sensor signal transmission wire 408 of the first small light emitting substrate. The AD converter 708 A/D converts and then outputs the input measurement result. The A/D converted measurement result is used in control for suppressing brightness unevenness and color unevenness in the LED backlight apparatus 701.

As shown in FIG. 16, a path for extracting the measurement result of the brightness sensor 703 provided on the intermediate substrate 706 to the exterior of the LED backlight apparatus 701 is constituted by the sensor signal wire 801 printed on the intermediate substrate 706 and the sensor signal transmission wire 408 printed on the first small light emitting substrate.

A path for extracting the measurement result of the brightness sensor 703 provided on the intermediate substrate 704 to the exterior of the LED backlight apparatus 701 is constituted by the sensor signal wire 801 printed on the intermediate substrate 704, the sensor signal transmission wires 408 printed on the small light emitting substrates of the small light emitting substrate groups 712 to 714, and the sensor signal transmission wires 802 printed on the intermediate substrates 705, 706. In other words, when the brightness sensor is provided on at least one intermediate substrate other than the intermediate substrate adjacent to the first small light emitting substrate, the path for extracting the measurement result of the brightness sensor to the exterior of the backlight apparatus (the exterior of the light source apparatus) is constituted by the sensor signal wire 801 printed on the intermediate substrate provided with the brightness sensor, the sensor signal transmission wire 408 printed on the small light emitting substrate positioned closer to the driving unit than the intermediate substrate, and the sensor signal transmission wire 802 printed on the intermediate substrate positioned closer to the driving unit than the aforesaid intermediate substrate.

All other configurations are similar to the first embodiment (FIG. 8), and therefore description thereof has been omitted.

According to this embodiment, as described above, even when the backlight apparatus includes the brightness sensor, brightness unevenness and color unevenness in the light emitting surface can be suppressed and a reduction in thickness can be achieved without incurring a cost increase. More specifically, by printing wiring on each substrate and combining the respective substrates, a path for extracting the measurement result of the brightness sensor to the exterior of the backlight apparatus can be constructed without the use of a wire harness. As a result, brightness unevenness and color unevenness in the light emitting surface can be suppressed and a reduction in thickness can be achieved without incurring a cost increase.

In this embodiment, the AD converter 708 is provided on the control substrate 707, but the present invention is not limited to this configuration, and the AD converter 708 may be provided in a separate apparatus to the backlight apparatus.

(Third Embodiment)

In this embodiment, a configuration of a light source apparatus capable of reducing noise received by the measurement result of the brightness sensor (a brightness sensor signal) from the control signal will be described. Note that in the drawings, identical reference numerals have been allocated to members that are identical to the first and second embodiments, and description thereof has been omitted.

Figure 17:
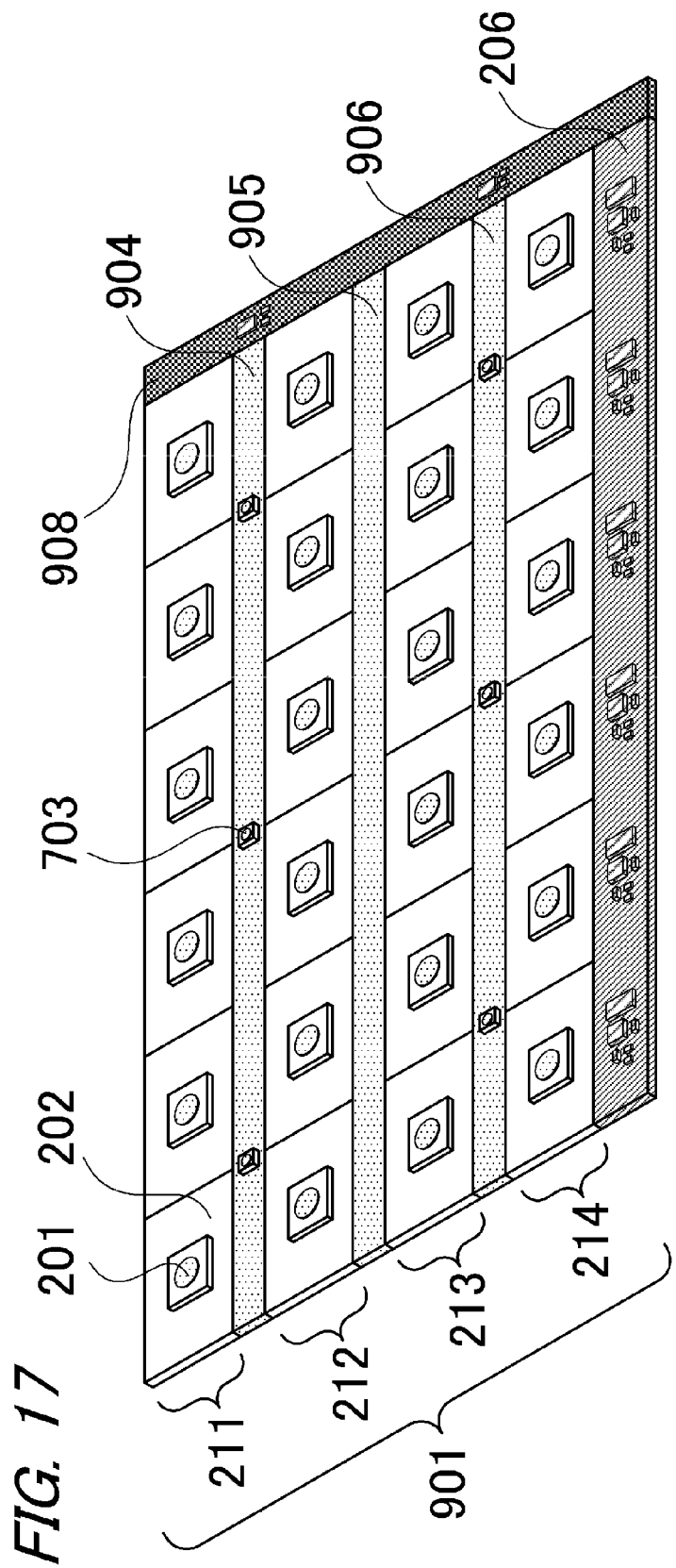
FIG. 17 shows an example of a configuration of an LED backlight apparatus according to the third embodiment.

FIG. 17 is a pattern diagram showing an example of a configuration of an LED backlight apparatus 901 according to this embodiment.

The LED backlight apparatus 901 according to this embodiment includes the plurality of (twenty-four) small light emitting substrates 202, intermediate substrates 904 to 906, the control substrate 206, the brightness sensor 703, and an AD converter substrate 908.

The small light emitting substrate group 211 forming the first row and the small light emitting substrate group 212 forming the second row are connected by the intermediate substrate 904. The small light emitting substrate group 212 forming the second row and the small light emitting substrate group 213 forming the third row are connected by the intermediate substrate 905. The small light emitting substrate group 213 forming the third row and the small light emitting substrate group 214 forming the fourth row are connected by the intermediate substrate 906.

The AD converter substrate 908 is a substrate including the AD converter 708 for A/D converting the measurement result of the brightness sensor 703, and is disposed in a location enabling connection via a connector to the intermediate substrates 904, 906 on which the brightness sensor 703 is mounted. In the example of FIG. 17, the AD converter substrate 908 is disposed on one end of the row direction of the plurality of small light emitting substrates.

Figure 18:
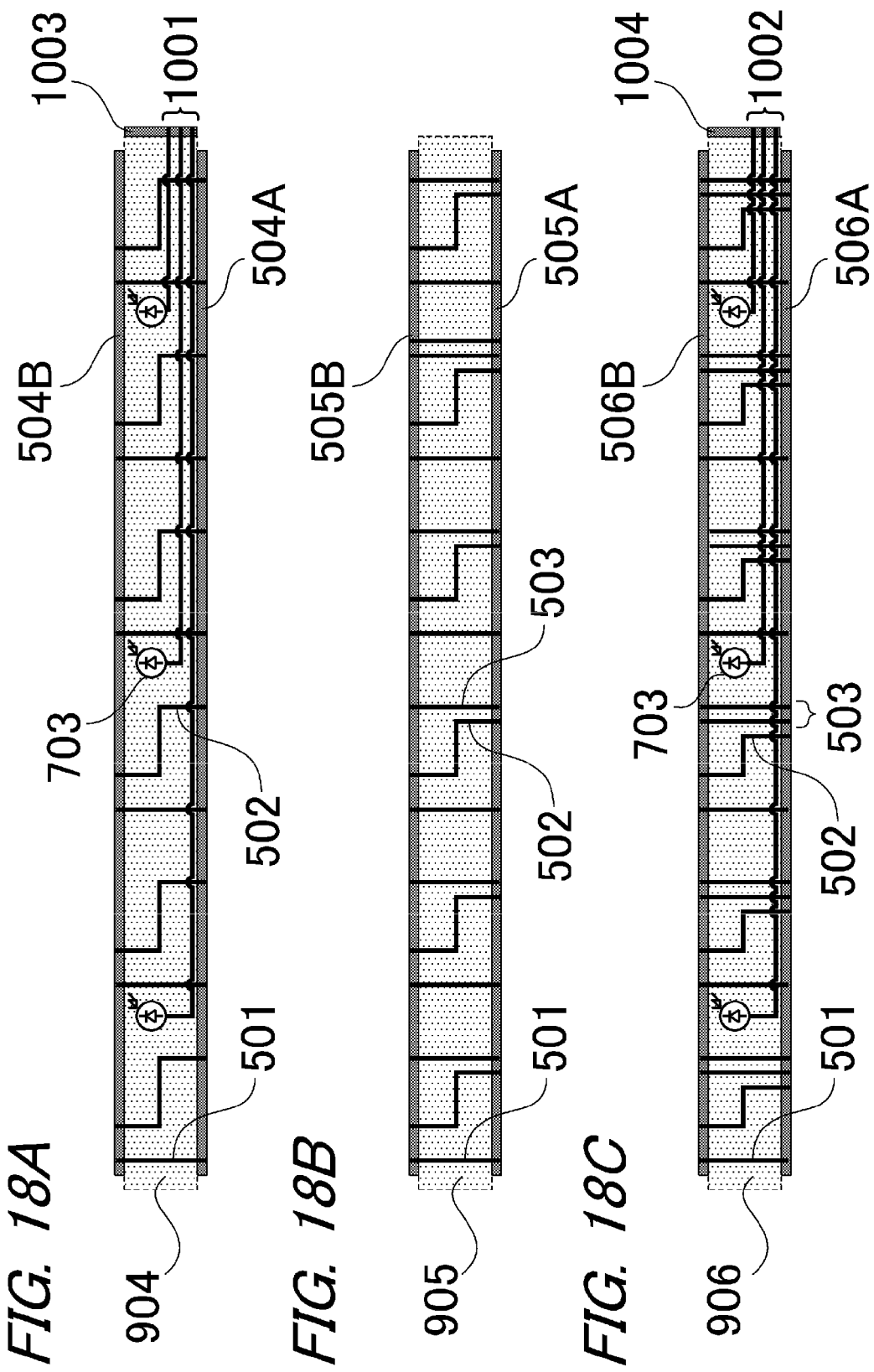
FIGS. 18A to 18C show examples of an electric circuit configuration of an intermediate substrate according to the third embodiment.

FIGS. 18A to 18C are pattern diagram showing examples of electric circuit configurations of the intermediate substrate 904, the intermediate substrate 905, and the intermediate substrate 906, respectively.

As shown in FIG. 18A, the intermediate substrate 904 includes the brightness sensor 703.

A sensor signal wire 1001 (an extraction wiring) for extracting a measurement result from the brightness sensor 703 on the intermediate substrate 904 to the exterior of the LED backlight apparatus 901 is printed on the intermediate substrate 904. More specifically, the sensor signal wire 1001 is printed such that the measurement result of the brightness sensor 703 is input into the AD converter substrate 908 via a connector 1003.

All other configurations are similar to those of the intermediate substrate 203 according to the first embodiment (FIG. 7A), and therefore description thereof has been omitted.

As shown in FIG. 18B, the intermediate substrate 905 is configured similarly to the intermediate substrate 204 according to the first embodiment (FIG. 7B).

As shown in FIG. 18C, the intermediate substrate 906 includes the brightness sensor 703.

A sensor signal wire 1002 (an extraction wiring) for extracting a measurement result from the brightness sensor 703 on the intermediate substrate 906 to the exterior of the LED backlight apparatus 901 is printed on the intermediate substrate 906. More specifically, the sensor signal wire 1002 is printed such that the measurement result of the brightness sensor 703 is input into the AD converter substrate 908 via a connector 1004.

All other configurations are similar to those of the intermediate substrate 205 according to the first embodiment (FIG. 7C), and therefore description thereof has been omitted.

Figure 19:
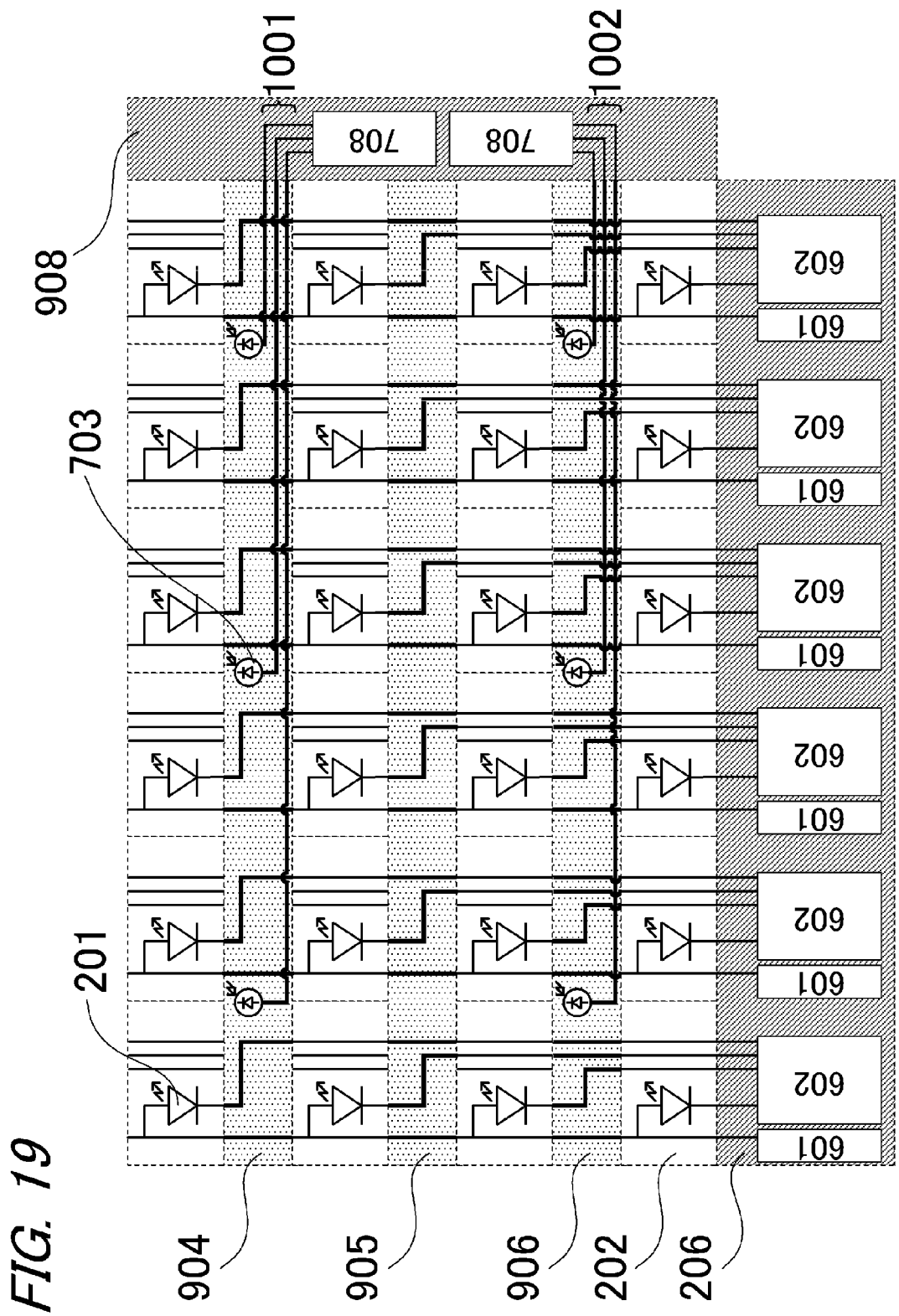
FIG. 19 shows an example of an overall electric circuit configuration of the LED backlight apparatus according to the third embodiment.

FIG. 19 is a pattern diagram showing an example of an overall electric circuit configuration of the LED backlight apparatus 901.

As shown in FIG. 19, the sensor signal wire 1001 of the intermediate substrate 904 is printed to be orthogonal to the other wiring (the control signal wire, for example) printed on the intermediate substrate 904. Further, the sensor signal wire 1001 of the intermediate substrate 906 is printed to be orthogonal to the other wiring printed on the intermediate substrate 906.

In the configuration of the second embodiment shown in FIG. 16, the sensor signal wire and the control signal wire are printed in long-distance parallel. A rectangular wave having a large current amount flows along the control signal wire. Therefore, with the configuration of the second embodiment shown in FIG. 16, the sensor signal flowing along the sensor signal wire may receive noise caused by electromagnetic induction. According to this embodiment, the sensor signal wire for extracting the measurement result from the brightness sensor to the exterior of the backlight apparatus is printed to be orthogonal to the other wiring, and therefore the effect of this noise can be greatly reduced.

Note that when the intermediate substrate 904 shown in FIG. 18A is divided into a plurality of intermediate substrates (sub-intermediate substrates) adjacent to each other in the row direction, the sensor signal wire 1001 is broken. Similarly, when the intermediate substrate 906 shown in FIG. 18C is divided, the sensor signal wire 1002 is broken. In a case where a signal wire is broken due to division of an intermediate substrate, the divided intermediate substrates may be provided with connectors for connecting the signal wires broken by the division. FIG. 21B shows an example of a case in which the intermediate substrate 904 shown in FIG. 18A is divided into three intermediate substrates (sub-intermediate substrates) adjacent to each other in the row direction. In this case, the sensor signal wire 1001 is broken by the division. Therefore, the divided intermediate substrates may be provided with connectors for connecting the sensor signal wires 1001 printed on the respective intermediate substrates to the sensor signal wire 1001 printed on an adjacent intermediate substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-206142, filed on Sep. 21, 2011, and Japanese Patent Application No. 2012-175940, filed on Aug. 8, 2012, which are hereby incorporated by reference herein in their entirety.

What is claimed is:

1. A light source apparatus comprising:
    a plurality of light emitting substrates arranged in matrix form, each having at least one light source;
    an intermediate substrate provided between respective rows of the plurality of light emitting substrates; and
    a driving unit that outputs a drive signal for driving the light sources,
    wherein a first supply wiring for supplying the drive signal to the light source provided on each of the plurality of light emitting substrates is printed on each of the light emitting substrates,
    a first connection wiring for electrically connecting the first supply wirings printed on two light emitting substrates sandwiching the intermediate substrate is printed on the intermediate substrate,
    the drive signal output by the driving unit is input into a first light emitting substrate of the plurality of light emitting substrates, which is a light emitting substrate positioned on one end in a column direction,
    a path for supplying the drive signal to the light source of the first light emitting substrate is constituted by the first supply wiring printed on the first light emitting substrate, and
    a path for supplying the drive signal to the light source of a second light emitting substrate of the plurality of light emitting substrates, which is a light emitting substrate other than the first light emitting substrate, is constituted by the first supply wiring printed on the second light emitting substrate, the first supply wiring printed on a light emitting substrate positioned closer to the driving unit than the second light emitting substrate, and the first connection wiring printed on the intermediate substrate provided between the light emitting substrates.

2. The light source apparatus according to claim 1, further comprising a control unit that outputs a control signal for controlling a light emission brightness of the light source,
    wherein the control signal output by the control unit is input into the first light emitting substrate,
    a second supply wiring for supplying the control signal to the light source provided on each of the plurality of light emitting substrates is further printed on each of the light emitting substrates,
    a first transmission wiring for transmitting the control signal is further printed on at least a light emitting substrate, from among the plurality of light emitting substrates, other than a light emitting substrate positioned furthest from the control unit,
    a second connection wiring is further printed on the intermediate substrate to electrically connect the first transmission wiring printed on a light emitting substrate positioned close to the control unit, from among two light emitting substrates sandwiching the intermediate substrate, to the second supply wiring printed on a light emitting substrate positioned far from the control unit, from among two light emitting substrates sandwiching the intermediate substrate,
    a path for supplying the control signal to the light source of the first light emitting substrate is constituted by the second supply wiring printed on the first light emitting substrate, and
    a path for supplying the control signal to the light source of a third light emitting substrate of the plurality of light emitting substrates, which is a light emitting substrate on a row adjacent to the first light emitting substrate, is constituted by the second supply wiring printed on the third light emitting substrate, the first transmission wiring printed on the first light emitting substrate, and the second connection wiring printed on the intermediate substrate provided between the light emitting substrates.

3. The light source apparatus according to claim 2, wherein a third connection wiring is further printed on an intermediate substrate other than an intermediate substrate positioned furthest from the control unit to electrically connect the first transmission wirings printed on the two light emitting substrates sandwiching the intermediate substrate, and
    a path for supplying the control signal to the light source of a fourth light emitting substrate of the plurality of light emitting substrates, which is a light emitting substrate positioned further from the control unit than the third light emitting substrate, is constituted by the second supply wiring printed on the fourth light emitting substrate, the second connection wiring printed on an intermediate substrate adjacent to a control unit side of the fourth light emitting substrate, the first transmission wiring printed on light emitting substrates positioned closer to the control unit than the fourth light emitting substrate, and the third connection wiring printed on the intermediate substrate provided between the light emitting substrates positioned closer to the control unit than the fourth light emitting substrate.

4. The light source apparatus according to claim 1, further comprising a brightness sensor that is provided on an intermediate substrate adjacent to the first light emitting substrate and that measures a light emitting brightness of the light source apparatus, wherein a second transmission wiring for transmitting a measurement result of the brightness sensor is further printed on at least the first light emitting substrate of the plurality of light emitting substrates, an extraction wiring for extracting the measurement result from the brightness sensor is further printed on the intermediate substrate provided with the brightness sensor, and a path for extracting the measurement result of the brightness sensor to an exterior of the light source apparatus is constituted by the extraction wiring printed on the intermediate substrate provided with the brightness sensor and the second transmission wiring printed on the first light emitting substrate.

5. The light source apparatus according to claim 1, further comprising a brightness sensor that is provided on at least one intermediate substrate other than an intermediate substrate adjacent to the first light emitting substrate and that measures a light emitting brightness of the light source apparatus, wherein a second transmission wiring for transmitting a measurement result of the brightness sensor is further printed on at least a light emitting substrate, from among the plurality of light emitting substrates, positioned closer to the driving unit than the intermediate substrate having the brightness sensor, an extraction wiring for extracting the measurement result from the brightness sensor is further printed on the intermediate substrate provided with the brightness sensor, a fourth connection wiring is further printed on an intermediate substrate positioned closer to the driving portion than the intermediate substrate provided with the brightness sensor to electrically connect the second transmission wirings printed on two light emitting substrates sandwiching the intermediate substrate, and a path for extracting the measurement result of the brightness sensor to an exterior of the light source apparatus is constituted by the extraction wiring printed on the intermediate substrate provided with the brightness sensor, the second transmission wiring printed on the light emitting substrate positioned closer to the driving unit than the intermediate substrate, and the fourth connection wiring printed on an intermediate substrate positioned closer to the driving unit than the intermediate substrate.

6. The light source apparatus according to claim 1, further comprising a brightness sensor that is provided on at least one intermediate substrate and that measures a light emitting brightness of the light source apparatus, wherein an extraction wiring for extracting a measurement result from the brightness sensor to an exterior of the light source apparatus is printed on the intermediate substrate provided with the brightness sensor, and the extraction wiring is printed to be orthogonal to other wiring printed on the intermediate substrate on which the extraction wiring is printed.

7. The light source apparatus according to claim 1, wherein the plurality of light emitting substrates have identical mounted components and printed wiring.

8. The light source apparatus according to claim 1, wherein the intermediate substrate is divided into a plurality of sub-intermediate substrates adjacent to each other in a row direction.

9. The light source apparatus according to claim 6, wherein the intermediate substrate is divided into a plurality of sub-intermediate substrates adjacent to each other in a row direction, and connectors for connecting extraction wirings printed on the respective sub-intermediate substrates to each other are provided on the respective sub-intermediate substrates.

* * * * *